United States Patent [19]

Suda et al.

[11] Patent Number: 4,492,994

[45] Date of Patent: Jan. 8, 1985

[54] VIDEO TAPE RECORDER

[75] Inventors: Kenichi Suda, Kawasaki; Katsuyuki Tamaki, Yokohama; Kazushi Tateishi, Kawasaki; Kohichiroh Abe, Tokyo, all of Japan

[73] Assignees: Tokyo Shibaura Denki Kabushiki Kaisha; Teac Corp., both of Japan

[21] Appl. No.: 348,177

[22] Filed: Feb. 12, 1982

[30] Foreign Application Priority Data

Feb. 16, 1981 [JP] Japan ................... 56-21029

[51] Int. Cl.³ .............. G11B 5/08; G11B 5/008; G11B 15/00; G11B 17/00
[52] U.S. Cl. ................... 360/85; 360/95; 360/96.3
[58] Field of Search ............ 360/85, 96.4, 96.5, 360/74.1, 105, 95, 71, 96.3; 242/200, 198; 226/90-94

[56] References Cited

U.S. PATENT DOCUMENTS

| | | | |
|---|---|---|---|
| 3,979,772 | 9/1976 | Umeda | 360/95 |
| 4,121,267 | 10/1978 | Hayashi | 360/85 |
| 4,149,202 | 4/1979 | Terada et al. | 360/96.3 |
| 4,419,702 | 12/1983 | Tanaka | 360/74.1 |

FOREIGN PATENT DOCUMENTS

| | | |
|---|---|---|
| 3018312 | 11/1981 | Fed. Rep. of Germany . |
| 1603180 | 5/1978 | United Kingdom . |
| 2003646 | 8/1978 | United Kingdom . |
| 2009997 | 11/1978 | United Kingdom . |
| 2071900 | 2/1981 | United Kingdom . |

Primary Examiner—Robert M. Kilgore
Attorney, Agent, or Firm—Cushman, Darby & Cushman

[57] ABSTRACT

A video tape recorder comprises a loading disc, a supply reel mount and a take-up reel mount, a reel mount driving device to be selectively associated with the supply reel mount and the take-up reel mount to establish recording, playback, rewinding, fast-forward, and stop modes, and a mode switching device for selectively transmitting the rotary force of the motor to the loading disc and the reel mount driving device so that the loading disc is rotated when the rotary force is transmitted to the loading disc, and that the reel mount driving device is set to a selected one of said modes when the rotary force is transmitted to the reel mount driving device.

7 Claims, 47 Drawing Figures

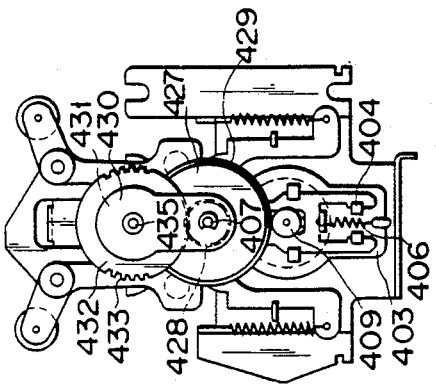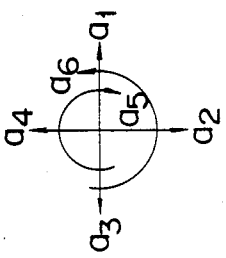
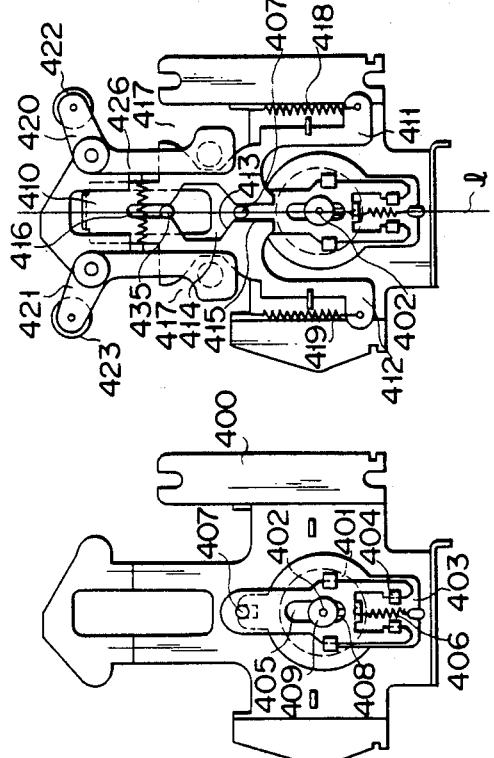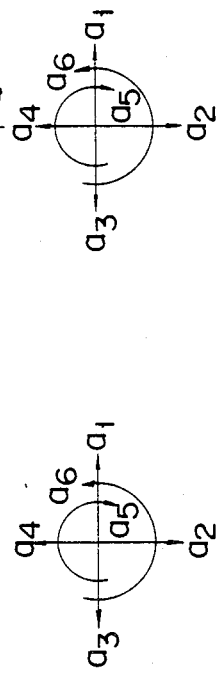
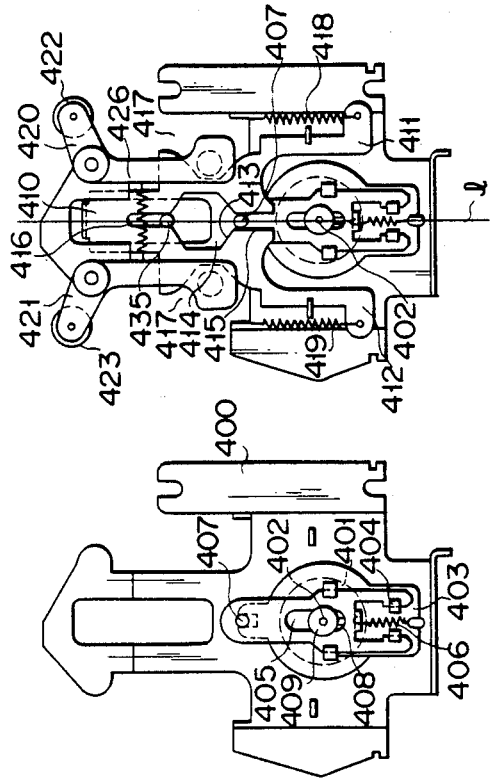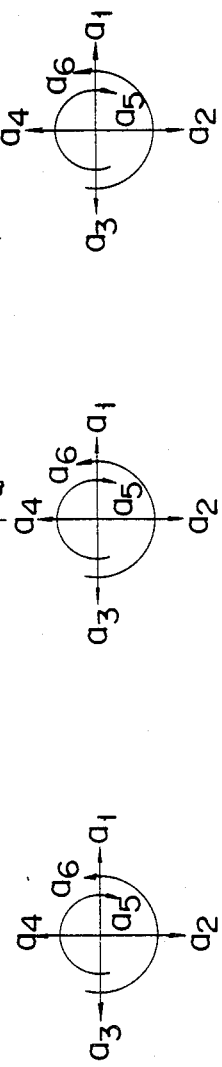
FIG. 20A   FIG. 20B   FIG. 20C F I G. 21A
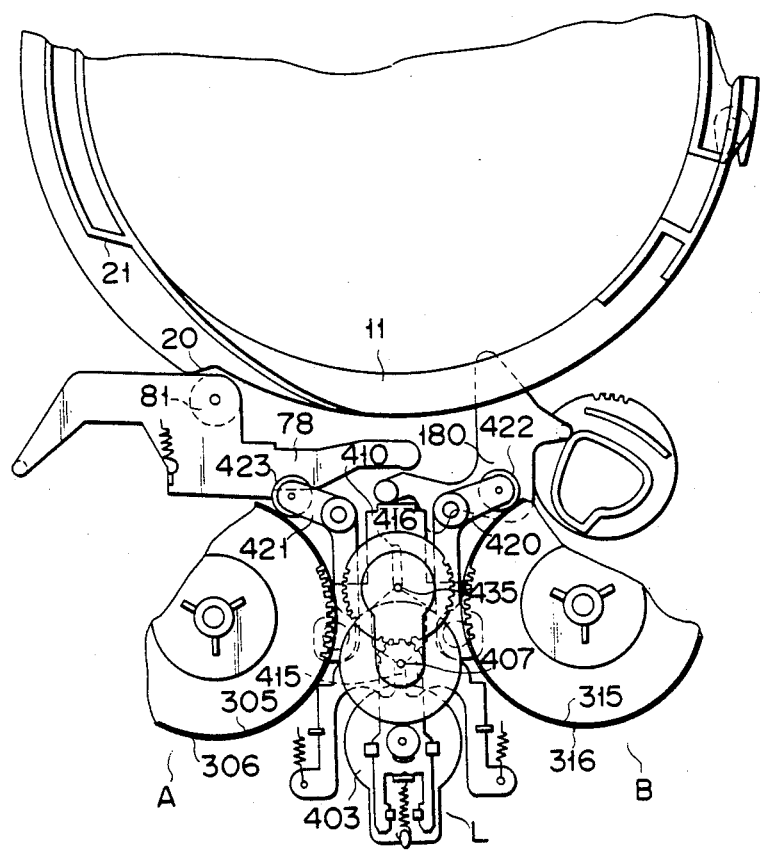

F I G. 21B
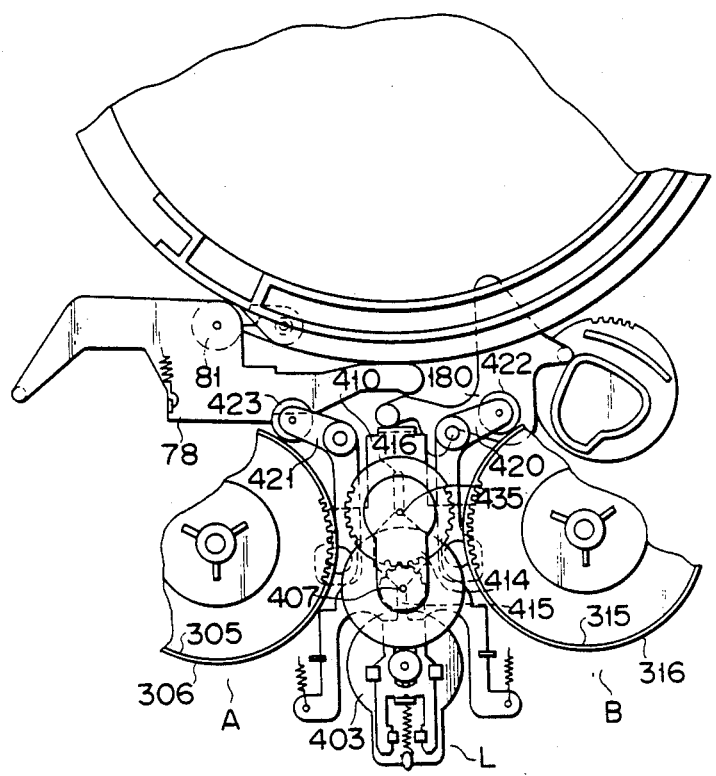

VIDEO TAPE RECORDER

BACKGROUND OF THE INVENTION

This invention relates to a video tape recorder capable of loading and unloading through rotation of a loading disc and including a reel mount driving device to be selectively associated with a supply reel mount or a take-up reel mount to establish a recording, playback, rewinding, fast-forward, or stop mode, more specifically to a video tape recorder adapted for miniaturization and light-weight design.

In general, a video tape recorder (hereinafter referred to as VTR) is so designed as to be able to record selectively signals from the tuner of a television set or from a television camera. When using such a VTR in combination with the TV camera, the VTR is expressly required to be light in weight, compact and portable. When using the VTR with the tuner or the camera, moreover, the VTR is naturally expected to exhibit high operating capability.

For improved operating capability, the VTR is conventionally provided with a multitude of plungers for controlling various functions. In order to drive selectively the supply reel mount and the take-up reel mount to establish the recording, playback, rewinding, fast-forward, and stop modes, for example, the VTR requires at least four plungers. Thus, the VTR is increased both in weight and in cost.

SUMMARY OF THE INVENTION

The object of this invention is to provide a video tape recorder capable of using the power of a motor, which is intended to rotate a loading disc, also for switching the operation mode, thus obviating the necessity of plungers for the mode switching and ensuring reduction in weight and size and improvement in operating capability.

A video tape recorder according to an aspect of this invention comprises a motor, a loading disc, a supply reel mount and a take-up reel mount, and a reel mount driving device to be selectively associated with the supply reel mount and the take-up reel mount to establish recording, playback, rewinding, fast-forward, and stop modes, the improvement which comprises mode switching means for selectively transmitting the rotatory force of the motor to the loading disc and the reel mount driving disc so that the loading disc is rotated when the rotatory force is transmitted to the loading disc, and that the reel mount driving device is set to a selected mode when the rotatory force is transmitted to the reel mount driving device.

In the video tape recorder according to the invention, the mode switching means capable of selectively operatively connecting the motor with the loading disc and the reel mount driving device is provided between them so that the operation mode of the reel mount driving device may be set by utilizing the rotatory force of the motor for rotating the loading disc for loading or unloading. Thus, the VTR can be reduced in size and weight, requiring no plungers for the operation mode setting.

BRIEF DESCRIPTION OF THE DRAWINGS

FIGS. 1 to 25A and 25B show a video tape recorder according to an embodiment of this invention, wherein:

FIG. 1 is a plan view showing a general arrangement before the establishment of a loading mode;

FIG. 2 is a plan view showing a general arrangement in the loading mode;

FIG. 6 is a perspective view showing the relationship between a cassette detecting member and a first detecting arm;

FIG. 8 is a plan view showing part of a mode switching device;

FIGS. 13 to 15 are plan views showing a reel mount driving device and a tape tension control device in various operating states;

FIG. 16 is a perspective view showing a brake gear;

FIG. 17 is a partially broken front view showing the relationships between a supply reel mount, a take-up reel mount, and a driving mechanism therefor;

FIGS. 20A to 20C show the reel mount driving device, in which FIG. 20A is a plan view showing the relationship between a reel drive chassis and an idle slider, FIG. 20B is a plan view showing the relationships between the reel drive chassis, the slider and a brake lever, and FIG. 20C is a plan view showing an idle gear and an idle wheel gear;

FIGS. 21A to 21C are plan views showing the reel mount driving device and the detecting arm in various operating states;

FIG. 24 is a disassembled perspective view showing a roller clutch; and

FIGS. 25A and 25B are plan views showing different operating states of a brake gear.

DETAILED DESCRIPTION OF THE PREFERRED EMBODIMENT

Now there will be described an embodiment of this invention with reference to the accompanying drawings.

Arrangement of Main Mechanisms

Figure 1:
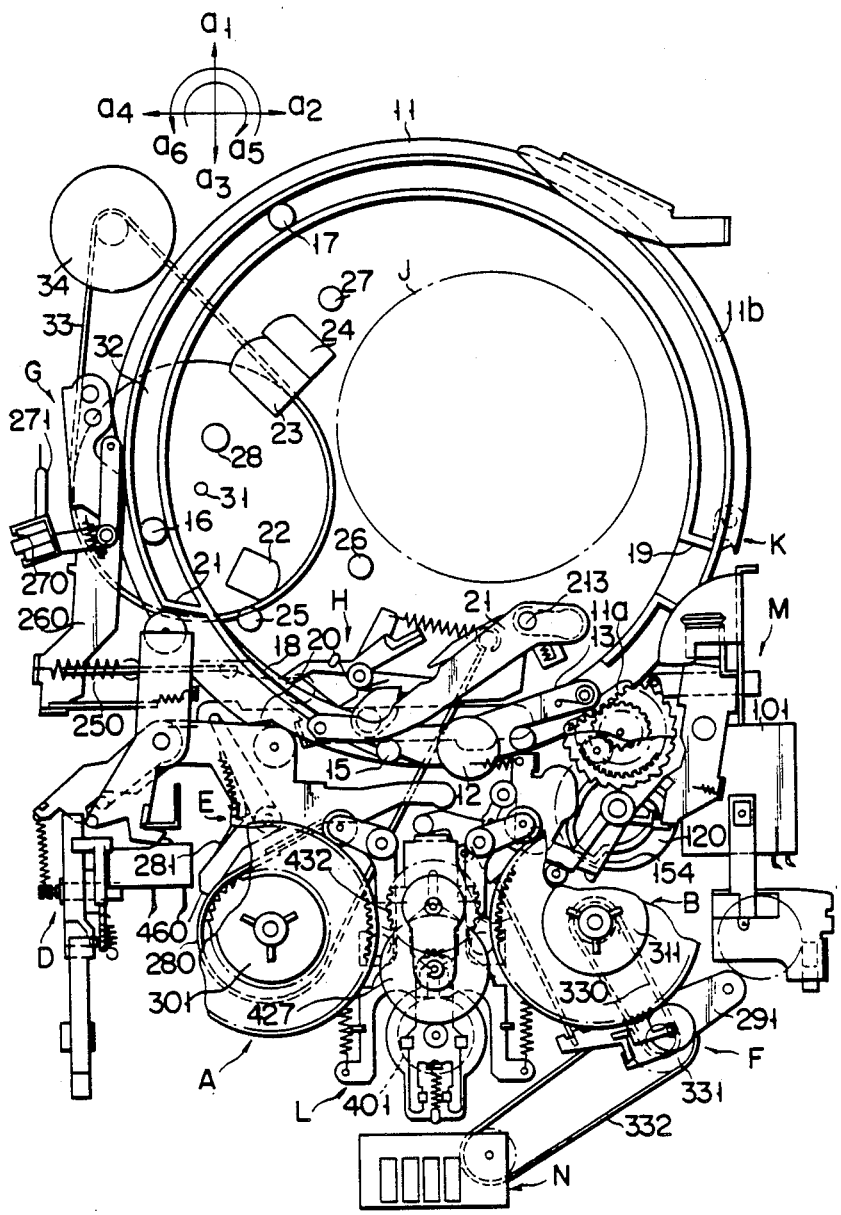
Figure 2:
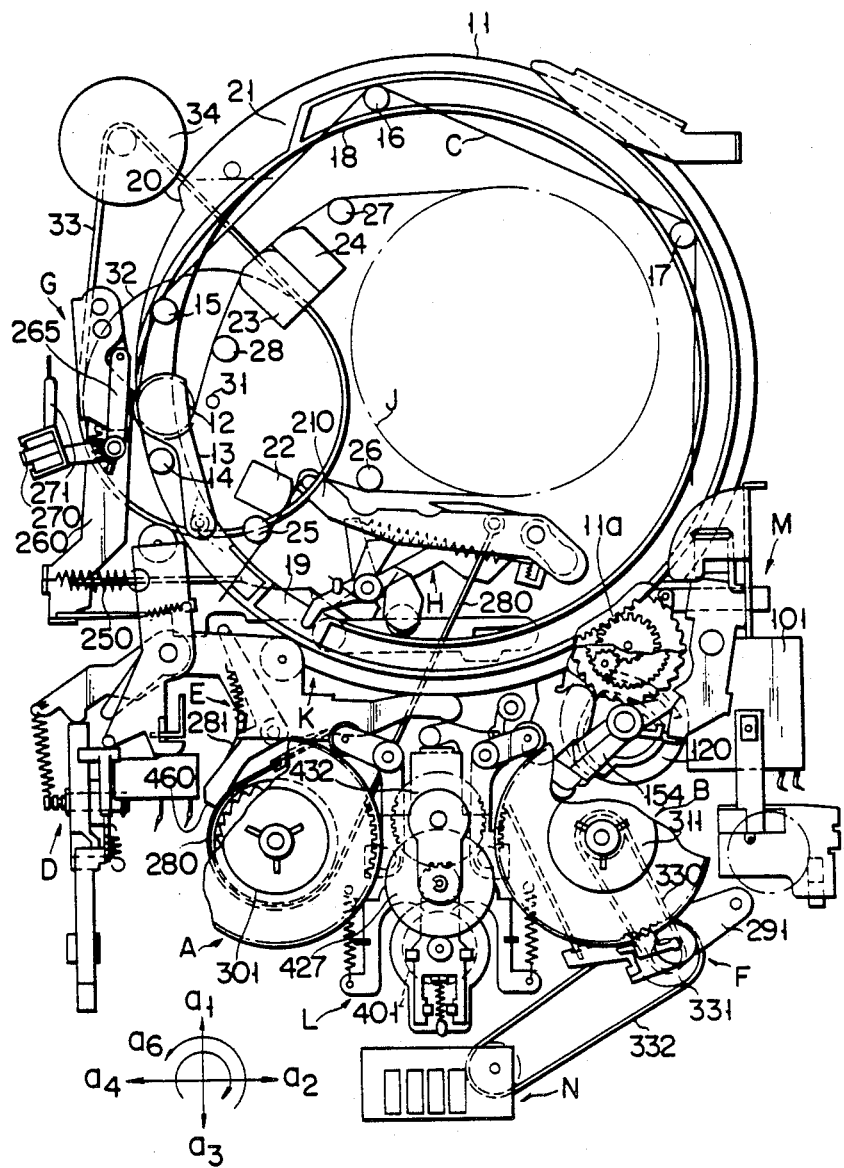

FIGS. 1 and 2 are general views showing the mechanism of the video tape recorder of this invention. FIG. 1 shows a state before the start of loading or after the completion of unloading, while FIG. 2 shows a state after the completion of loading or before the start of unloading. Numeral 11 designates a loading disc, and symbols A and B denote a supply reel mount device and a take-up reel mount device, respectively. A cassette containing a magnetic tape C (shown in FIG. 2) is associated with the reel mount devices A and B by means of a cassette setting device D. Brake devices E and F act on the reel mount devices A and B, respectively. Rotation of the take-up reel mount device B is transmitted to a counter N through a counter belt 330, a relay pulley 331, and a counter belt 332.

When the cassette is set in the VTR, the magnetic tape C is drawn out from a cassette case. At this time, the magnetic tape C is guided so as to be in contact with part of the peripheral surface of a cylinder J. The cylinder J is formed of upper and lower cylinders (not shown) between which a rotating head is located. The rotating head is rotated around the central axis of the cylinder J along the gap between the two cylinders. By the rotation of the rotating head, the magnetic tape C is scanned at an angle to the direction of its width, that is, scanned helically. In the feed path of the magnetic tape C lie a full-erasing head 22, an audio-control head 23, and an audio-erasing head 24. Also in the feed path of the magnetic tape C are arranged first, second, third and fourth guide poles 25, 26, 27 and 28 standing on the chassis of the VTR.

When the VTR is in the loading or unloading mode, the loading disc 11 is rotated on its own axis in the direction of an arrow $a_6$ or $a_5$ in FIG. 1. In the loading mode, the loading disc 11 is rotated from the position shown in FIG. 1 to the position shown in FIG. 2 in the direction of the arrow $a_6$. In each drawing, arrows to indicate the operating directions of the components or members shown therein are collected in a place. In the unloading mode, on the other hand, the loading disc 11 is rotated from the position of FIG. 2 to the position of FIG. 1 in the direction of the arrow $a_5$. A pinch roller 12 is attached to the upper rotating surface of the loading disc 11 by means of a rockable support arm 13. The pinch roller 12 is in the position shown in FIG. 2 after the completion of loading. When the VTR is in the playback or recording mode, the pinch roller 12 is pressed toward a capstan 31 by a pinch roller driving device G. The magnetic tape C is caused to run when the capstan 31 is rotated after the tape C is held between the pinch roller 12 and the capstan 31. The pinch roller driving device G will also be described with reference to FIGS. 13 and 14. The capstan 31 is coaxial with a flywheel 32 which is rotated in a fixed direction by a capstan motor 34 with the aid of a capstan belt 33.

Also on the upper rotating surface of the loading disc 11 stand a leading pole 14 and first, second and third return poles 15, 16 and 17. The leading pole 14 draws around the magnetic tape C as the loading disc 11 is rotated from the position of FIG. 1 to the position of FIG. 2. The first, second and third return poles 15, 16 and 17 define a tape feed path along the upper portion of the loading disc 11.

A gear portion 11a is formed substantially over the whole circumference of the loading disc 11. When a rotatory force is applied to the gear portion 11a, the loading disc 11 is allowed to rotate in the direction of the arrow $a_5$ or $a_6$. The relationship between the gear portion 11a and a mode switching device M will be described in connection with FIGS. 8 to 10.

Further, the loading disc 11 is provided with a plurality of cam means. Each cam means achieves its object when the loading disc 11 rotates. Formed on the inner peripheral side of the loading disc 11 is a cam structure for controlling a tape tension control device H which is formed of a tension arm 210 and other members. This cam structure includes a cam surface 18 and a cam portion 19. The tape tension control device H will be described in detail in conjunction with FIG. 15.

Formed on the outer peripheral side of the loading disc 11 is a cam structure for controlling the cassette setting device D. This cam structure includes cam surfaces 20 and 21. The cassette setting device D will be described in detail in conjunction with FIGS. 3 to 7. Formed on the outer peripheral side of the loading disc 11, moreover, is a variable angle cam mechanism K for controlling a reel mount driving device L.

The reel mount driving device L, which is disposed between the supply reel mount device A and the take-up reel mount device B, is intended to transmit the rotatory force of a reel motor 401 to a supply reel mount 301 or a take-up reel mount 311, according to the operation mode of the VTR. When the VTR is in the loading mode, an idle wheel gear 427 and an idle gear 432 of the driving device L are held halfway between the reel mounts 301 and 311, that is, in positions where they engage neither of the two reel mounts.

When the VTR is in the unloading mode, on the other hand, the force of the idle wheel gear 427 to rotate in the direction of the arrow $a_6$ on its own axis is transmitted to the take-up reel mount 311 to rotate the same in the direction of the arrow $a_5$. Also when the VTR is in the fast forward or fast playback mode, the rotatory force of the idle wheel gear 427 in the direction of the arrow $a_6$ is transmitted to the take-up reel mount 311. When the VTR is in the rewinding or fast reverse playback mode, the rotatory force of the idle wheel gear 427 in the direction of the arrow $a_5$ is transmitted to the supply reel mount 301 to rotate the same in the direction of the arrow $a_6$.

When the VTR is in the recording or playback mode, the force of the idle gear 432 to rotate in the direction of the arrow $a_6$ on its own axis is transmitted to the take-up reel mount 311. When the VTR is in the reverse playback mode, moreover, the rotatory force of the idle gear 432 in the direction of the arrow $a_5$ is transmitted to the supply reel mount 301. The reel mount driving device L will be described in conjunction with FIGS. 19A to 21C.

The brake devices E and F act on the supply reel mount device A and the take-up reel mount device B, respectively. In the recording or playback mode, the rotatory load on the supply reel mount 301 is controlled by a band brake 280. In the unloading mode, the supply reel mount 301 is braked by an eject brake lever 460 in its rotation in the direction of the arrow $a_5$ on its own axis, but is allowed to rotate in a fixed direction (i.e., in the direction of the arrow $a_6$). This is done because, in tape winding on the side of the take-up reel mount 311 for the unloading mode, the supply reel mount 301 is prevented from rotating following the tape winding action of the take-up reel mount, thereby checking advance or shift of the tape position between the loading and unloading modes.

As for the brake device F, it acts on the take-up reel mount device B. The brake device F imposes no load on the take-up reel mount 311 while the latter is rocking in the direction of the arrow $a_5$ on its central axis. In the reverse playback mode, the brake device F brakes the take-up reel mount 311, applying thereto a proper back tension to stabilize the tape feed. The brake device F will be described in detail in conjunction with FIG. 17.

The mode switching device M is driven by a loading motor 101. In the loading mode, the loading disc 11 can be driven to rotate in the direction of the arrow $a_6$ of FIG. 1. In the unloading mode, on the other hand, the loading disc 11 can be driven to rotate in the direction of the arrow $a_5$. The mode switching device M has various functions. When one of the several operation modes, including the recording, playback, fast forward, rewinding, reverse playback, static picture playback, and pause modes, is established by the control section of the VTR, the mode switching device M can switch the mechanism of the VTR to the established mode. The mode switching device M will further be described in conjunction with FIGS. 8 to 12.

Now there will be described in detail the construction of various individual parts of the VTR.

Figure 3A:
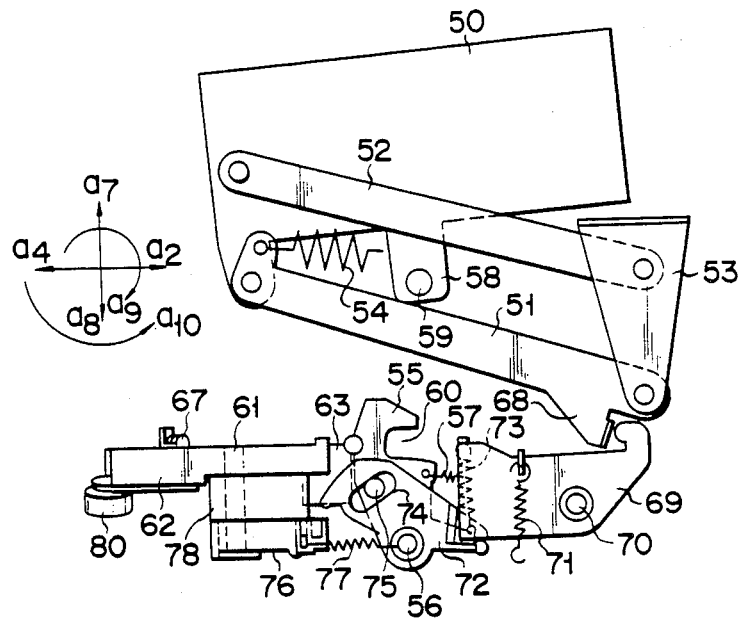
FIG. 3A is a side view of a cassette setting device.
Figure 3B:
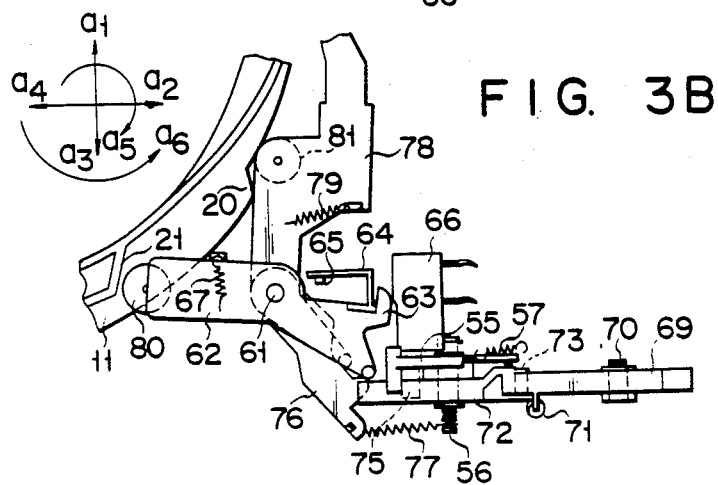
FIG. 3B is a plan view showing the cassette setting device and part of a loading disc.
Figure 4A:
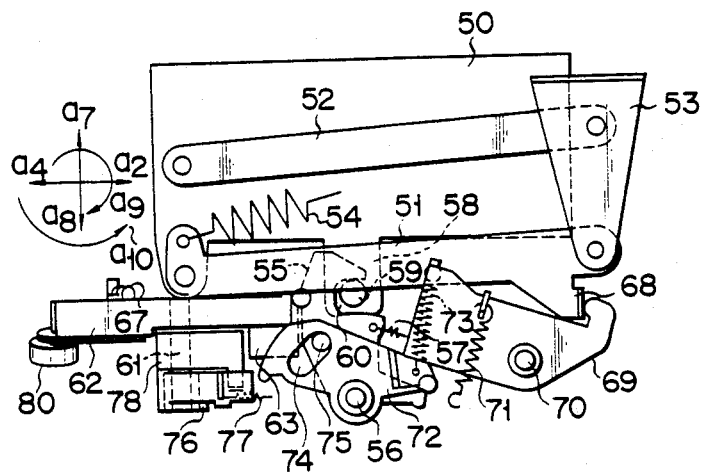
FIGS. 4A and 5A are side views corresponding to FIG. 3A, showing different states.
Figure 4B:
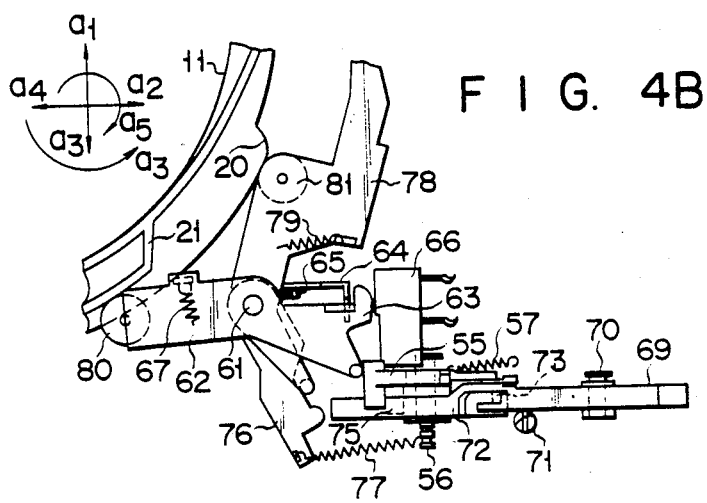
FIGS. 4B and 5B are plan views corresponding to FIG. 3B, showing the different states.
Figure 5A:
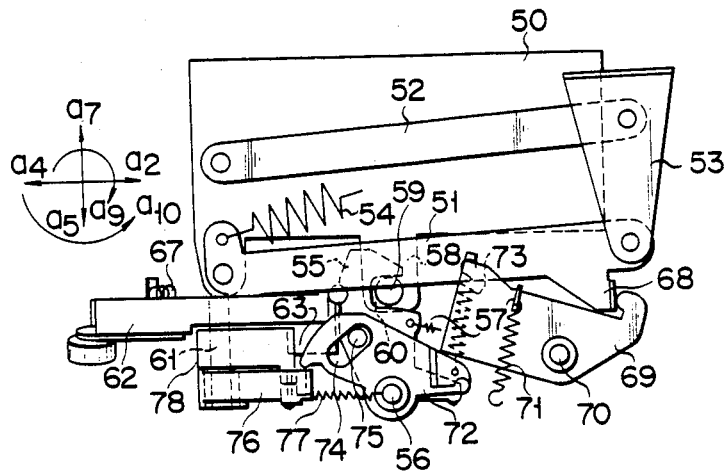
Figure 5B:
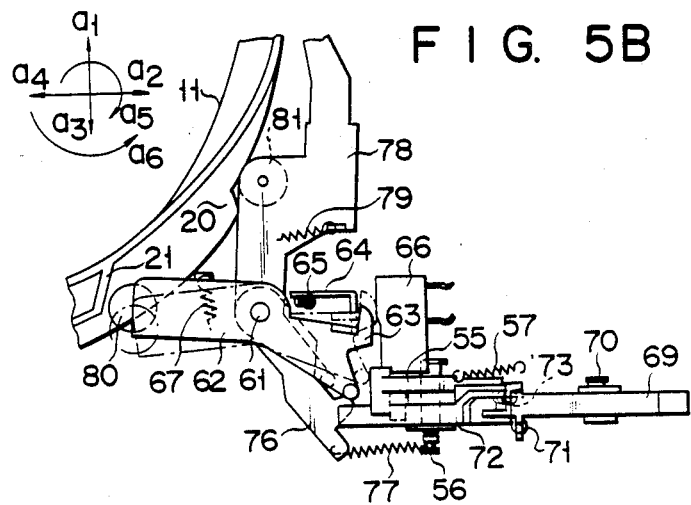

Referring first to FIGS. 3A, 3B, 4A, 4B, 5A, 5B, 6, 7A and 7B, there will be described the cassette setting device for setting a cassette in position in the VTR and removing the set cassette from the VTR. Hereupon, FIGS. 3A, 4A and 5A are side views showing the mechanism in the vicinity of the cassette setting device, while FIGS. 3B, 4B and 5B are top views showing substantially the same mechanism.

FIGS. 3A and 3B show a state before the cassette is set in position in the VTR. In these drawings, numeral 50 designates a cassette holder into which the cassette is inserted through an opening (not shown) formed in one side face thereof, for example. The cassette holder 50 is inserted into or removed from the housing of the VTR through an opening (not shown) formed in a cabinet as the VTR housing. Respective one ends of a lifter 51 and a link 52 are rockably mounted on that side face of the cassette holder 50 which intersects the aforesaid cassette insertion opening at right angles, for example. The lifter 51 and link 52, extending substantially in parallel with each other, have their respective other ends rockably mounted on a retaining portion 53 which is disposed inside the VTR housing. The one end of the lifter 51 is pulled by a cassette-up spring 54, and urged thereby to rock in the direction of an arrow $a_9$ in FIG. 3A. Another lifter to form a counterpart to the aforesaid lifter 51 is disposed on the side face of the cassette holder 50 opposite to the shown side face thereof so that the pair of lifters may rock in synchronism with each other. The cassette-up spring 54 is disposed on one or either side of the cassette holder 50. Likewise, the link 52 is disposed on one or either side of the cassette holder 50. Further, a roller 59 is attached to a tongue portion 58 of the cassette holder 50. Alternatively, the roller 59 may be attached to the lifter 51 without changing its function.

Inside the VTR housing, on the other hand, a locker 55 is disposed so as to be able to rock around a locker post 56 at the lower portion thereof in the directions of arrows $a_9$ and $a_{10}$ in FIG. 3A. The locker 55 is normally urged to rock in the direction of the arrow $a_9$ by a spring 57.

Cassette Setting Operation

In such construction, when the cassette holder 50 is pressed downward or in the direction of an arrow $a_8$ in FIG. 3A, the lifter 51 and link 52 rock in the direction of the arrow $a_{10}$ to lead the cassette holder 50 into the VTR housing. At this time, the roller 59 on the tongue portion 58 extending in the direction of the arrow $a_8$ from the cassette holder 50 abuts against the inclined upper end face of the locker 55 to rock the same in the direction of the arrow $a_{10}$. Then, when the roller 59 reaches a recess or engaging portion 60 formed on one end side of the locker 55, the locker 55 is rocked in the direction of the arrow $a_9$ by the tensile force of the spring 57 to allow the roller 59 to be fitted in the engaging portion 60. Thus, the cassette is set in position inside the VTR housing to be ready for loading. This state or position is shown in FIGS. 4A and 4B.

Figure 6:
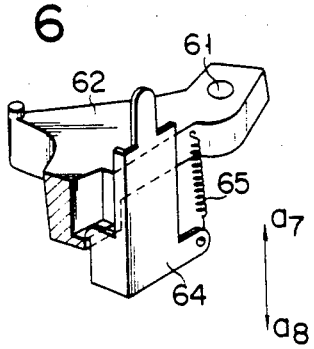

Further provided is a mechanism for detecting the aforesaid cassette setting in the VTR housing to time the start of the loading operation. Namely, a first detecting arm 62 is disposed in the VTR housing so as to be able to rock around a vertical post 61 in the directions of the arrows $a_5$ and $a_6$ in FIG. 4B. One free end portion of the first detecting arm 62 extends close to the locker 55, having a switch operating portion 63 formed projectingly thereon. The other free end portion (mentioned in detail later) extends up to the region over the top surface of the loading disc 11. Inside the VTR housing, moreover, a cassette detecting member 64 is mounted on the chassis so as to be able to slide in the directions of arrows $a_7$ and $a_8$ in FIGS. 4A and 6, that is, vertically. As shown in FIG. 6, the cassette detecting member 64 is normally urged to rock in the direction of the arrow $a_7$ by a tension spring 65. The slide of the cassette detecting member 64 in the direction of the arrow $a_8$ is regulated by the engagement of its downwardly extended portion with the lower end face of the detecting arm 62. Provided inside the VTR housing, furthermore, is a cassette-in switch 66 operated by the switch operating portion 63. While the detecting arm 62 is engaged with the detecting member 64, the operating portion 63 is separated from the switch 66, as shown in FIG. 7A.

In the above-mentioned construction, when the locker 55 is pressed by the roller 59 to rock in the direction of the arrow $a_{10}$ in FIG. 3A, the detecting arm 62 is pressed by the locker 55 to rock in the direction of the arrow $a_5$ in FIG. 3B. Thus, the engagement between the detecting arm 62 and the cassette detecting member 64 mentioned in conjunction with FIG. 6 is removed, and the cassette detecting member 64 is allowed to slide in the direction of the arrow $a_8$. At this time, when the cassette holder 50 loaded with the cassette is led into the VTR housing, the cassette detecting member 64 is pressed by the under surface of the cassette through an opening (not shown) formed in the under surface of the cassette holder 50, to be slidden in the direction of the arrow $a_8$, as indicated by chain line in FIG. 7B. Then, when the roller 59 gets engaged with the locker 55 to cause the cassette holder 50 to be held in the VTR housing, as described in conjunction with FIGS. 4A and 4B, the detecting arm 62 is released from the regulation by the locker 55 on its rocking action. As a result, the detecting arm 62 is rocked in the direction of the arrow $a_6$ by the tensile force of a spring 67, as indicated by chain line in FIG. 7A, and the cassette-in switch 66 is operated by the switch operating portion 63. When the cassette-in switch 66 is operated in this manner, the VTR starts loading, and the loading disc 11 rocks in the direction of the arrow $a_6$, as shown in FIG. 4B.

Figure 7A:
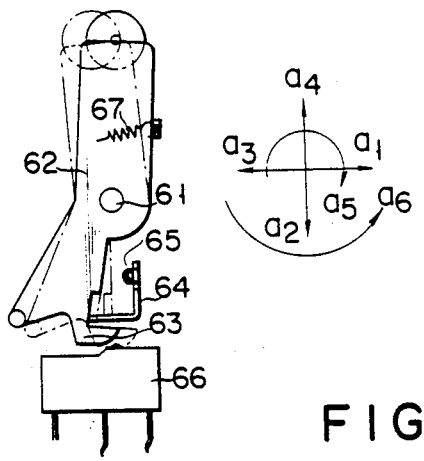
FIG. 7A is a plan view showing the relationship between the first detecting arm and a cassette switch.
Figure 7B:
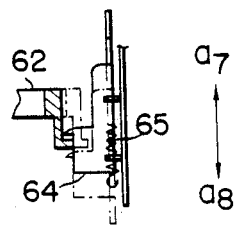
FIG. 7B is a sectional view showing engaging portions of the cassette detecting member and the first detecting arm.

In such construction, the cassette detecting member 64 cannot slide in the direction of the arrow $a_8$ in FIG. 7B unless the detecting arm 62 rocks in the direction of the arrow $a_5$ in FIG. 7A. Accordingly, it is possible to prevent such wrong operation that the cassette detecting member 64 may be slidden in the direction of the arrow $a_8$ by an impact due to vibration or falling to cause the detecting arm 62 to operate the switch 66.

In the construction shown in FIGS. 3A and 3B to 5A and 5B, there is additionally provided a mechanism for removing the cassette from the VTR housing, whereby the lock releasing force for releasing the roller 59 from the locking by the locker 55 at ejection is previously stored by taking advantage of the aforementioned action to set the cassette in position in the VTR, and the stored force is released in the ejecting operation.

Now there will be described the construction and operation of such mechanism.

Inside the VTR housing, an ejecting arm 69 to be operated by an operating portion 68 of the lifter 51 is mounted on the chassis so as to be able to rock around a post 70 in the direction of the arrows $a_9$ and $a_{10}$ in FIG. 4A, and is normally urged to rock in the direction of the arrow $a_{10}$ by a spring 71. Further, a lock release arm 72 is mounted on the locker post 56 so as to be able to rock in the directions of the arrows $a_9$ and $a_{10}$. Stretched between the lock release arm 72 and the ejecting arm 69 is a spring 73 for urging the arms 72 and 69 to rock in the directions of the arrows $a_9$ and $a_{10}$, respectively. The lock release arm 72 and the locker 55 are coupled together by means of a slot 74 slantly formed in the lock release arm 72 and a projection 75 formed on the locker 55 and loosely fitted in the slot 74 so that the two members 72 and 55 may independently rock within the range of the length of the slot 74. A second detecting arm 76 is mounted on the vertical post 61 so as to be able to rock in the directions of the arrows $a_5$ and $a_6$ in FIG. 4B. The second detecting arm 76 is normally urged to rock in the direction of the arrow $a_6$ by a spring 77, having its free end portion located under the lock release arm 72, as shown in FIG. 3B. (In FIG. 4B, the arm 76 is rocked in the direction of the arrow $a_5$, having its free end portion shifted from under the arm 72.) Between the first and second detecting arms 62 and 76, a third detecting arm 78 is mounted on the vertical post 61 so as to be able to rock in the directions of the arrows $a_5$ and $a_6$ in FIG. 4B. The third detecting arm 78 is normally urged to rock in the direction of the arrow $a_6$ by a spring 79, and is held in position against the projected portion of the chassis. When the third detecting arm 78 rocks in the direction of the arrow $a_5$, a pin projected downward from the detecting arm 78 abuts against the right end side of the second detecting arm 76 to rock the same in the same direction. A roller 80 is rotatably attached to the under surface of the free end portion of the first detecting arm 62 extending over the loading disc 11. Further, a roller clutch 81 is rotatably attached to the under surface of the free end portion of the third detecting arm 78 extending close to the side face of the loading disc 11. The two cam surfaces 21 and 20 formed on the loading disc 11 are designed as follows. That is, when the loading disc 11 is in the loading start position, the cam surfaces 21 and 20 trace circular arcs around the center of the loading disc 11, starting from near the roller 80 and the roller clutch 81 corresponding thereto, respectively (FIG. 3B). When the loading disc 11 is in the loading end position, the cam surface 20 terminates in the vicinity of the roller clutch 81, whereas the cam surface 21 extends beyond the position of the roller 80 (FIG. 4B).

Now there will be described the operation of the mechanism of the above-mentioned construction. Referring first to FIGS. 3A and 3B, when the cassette holder 50 is pushed in the direction of the arrow $a_8$, the ejecting arm 69 is pressed by the operating portion 68 to rock in the direction of the arrow $a_9$. As a result, the lock release arm 72 is rocked in the direction of the arrow $a_{10}$ by the spring 73, and is stopped with its free end portion received by the top surface of the detecting arm 76. In this state, the projection 75 is not in contact with the inner peripheral surface of the slot 74. Thereafter, only the ejecting arm 69 is further rocked against the tensile force of the springs 71 and 73. At the same time, the roller 59 is locked by the locker 55 in the aforesaid manner, the cassette-in switch 66 is operated by the switch operating portion 63, and the loading disc 11 is rotated in the direction of the arrow $a_6$ in FIG. 3B to start loading. When the loading disc 11 rotates, the roller clutch 81 runs on the cam surface 20 to rock the detecting arms 78 and 76 in the direction of the arrow $a_5$. This state is shown in FIGS. 4A and 4B. Then, the detecting arm 76 is disengaged from the lock release arm 72, so that the lock release arm 72 rocks in the direction of the arrow $a_{10}$ in FIG. 4A, and stops where the inner peripheral surface of the slot 74 abuts against the projection 75. At this time, the locker 55 does not rock in the direction of the arrow $a_{10}$, since the detecting arm 62, which is engaged with the locker 55, is restrained by the cam surface 21 from rocking in the direction of the arrow $a_{10}$. In this case, the detecting arm 62 locks the locker 55 just before the detecting arm 76 is disengaged from the lock release arm 72. This state may be maintained even after the loading is completed because the roller 80 on the arm 62 is kept in contact with the cam surface 21. As for the roller clutch 81, it is removed from the cam surface 20 after the completion of the loading, so that the detecting arms 76 and 78 are rocked in the direction of the arrow $a_6$ in FIG. 4B by the tensile force of the springs 77 and 79, respectively. Hereupon, unlike in the state shown in FIGS. 3A and 3B, the detecting arm 76 is displaced against the lock release arm 72 in the direction of the arrow $a_5$. In this state, the aforementioned lock release force is stored. It is because the detecting arm 78 doubles as means for removing the brakes on the reel mounts at loading and unloading, as mentioned later, that the roller clutch 81 is disengaged from the cam surface 20 on completion of the loading. For the use related to this mechanism only, the roller clutch 81 need not be disengaged from the cam surface 20.

When the ejecting operation is started in this state, the loading disc 11 rocks in the direction of the arrow $a_6$ in FIG. 5B. Then, the roller clutch 81 once abuts against the cam surface 20 to rock the detecting arms 78 and 86 in the direction of the arrow $a_5$ in FIG. 5B. When the unloading operation is completed, as shown in FIGS. 5A and 5B, the roller clutch 81 is disengaged again from the cam surface 20 to return the detecting arms 78 and 76 in the direction of the arrow $a_6$ in FIG. 5B. In this case, however, the detecting arm 76 abuts against the lock release arm 72 and is hence allowed to return only up to the position represented by chain line in FIG. 5B. Thus, the lock release arm 72 is prevented again from rocking in the direction of the arrow $a_{10}$ in FIG. 5A, and the roller clutch 81 is disengaged from the cam surface 21 substantially at the same time. Accordingly, the locker 55 is released from the locking by the detecting arm 62. As a result, the lock release arm 72 is rocked in the direction of the arrow $a_{10}$ in FIG. 5A by the lock releasing force stored in the spring 73, the locker 55 is rocked also in the direction of the arrow $a_{10}$, and the detecting arm 62 is rocked in the direction of the arrow $a_5$ in FIG. 5B. Thus, the roller 59 is released from the locking by the locker 55, and the cassette holder 50 is lifted from inside the VTR housing. Accordingly, the ejecting arm 69 rocks in the direction of the arrow $a_{10}$, so that the lock release arm 72 and the locker 55 rock in the direction of the arrow $a_9$. Further, the detecting arm 76 rocks in the direction of the arrow $a_6$, and the cassette detecting member 64 slides in the direction of the arrow $a_7$, thereby restoring the state shown in FIGS. 3A and 3B.

Thus, according to the arrangement of this invention, the lock release arm 72 is given the lock releasing force by taking advantage of the action to set the cassette holder 50 in position inside the VTR housing, and the detecting arms 76 and 78 and the cam surface 20 are provided in order to prevent the lock releasing force from being transmitted to the locker 55 in the modes before the start of loading. Moreover, the detecting arm 62 and the cam surface 21 are provided in order that the locker 55 may be locked to store the lock releasing force in the other modes than the ones before the tart of loading. When the unloading is ended, the locker 55 is released from the locking, and the lock releasing force is discharged to release the cassette holder 50 from the locking by the locker 55.

In the prior art arrangement, on the other hand, a solenoid plunger is driven in the ejecting operation to release the cassette holder from locking by the locker. In such an arrangement, the use of the solenoid plunger may complicate the circuit of the VTR, and lead to an increase in power consumption of the VTR, as well as in weight and size thereof. There is an alternative conventional method in which a user is directly to operate a lock release lever at ejection without using the solenoid plunger. According to this method, however, it is impossible to perform ejection by the so-called feather-touch operation.

According to the arrangement described above, the ejection can be achieved by the feather-touch operation, and only a few arms and springs are required as additional components. Thus, the VTR can be reduced in size and weight, and the circuit of the VTR can be simplified in configuration due to the full-mechanical process.

Further, the operating portion 68 may be formed on the cassette 50, and the means for giving the lock releasing force to the lock release arm 50 by taking advantage of the cassette holder setting action may variously be changed or modified according to the construction of support means for carrying and removing the cassette holder 50 to and from the predetermined position in the VTR housing.

Moreover, the detecting arms 78 and 76 may be integrally formed into a single arm having both the functions of the two arms 78 and 76. In this case, the arm may be driven by a position regulation portion, such as a cam surface, formed on the loading disc 11.

Turning to FIG. 3A, furthermore, the spring 71 may be omitted if the spring 73, coupling the ejecting arm 69 and the lock release arm 72, can provide enough moment of rotation around a part (circular portion in FIG. 3A) of the lock release arm 72 to act on the ejecting arm 69.

Mode Switching

Referring now to FIGS. 8, 9A to 9F, and 10A and 10B, there will be described the construction of the mode switching device M as a feature of this invention.

Figure 8:
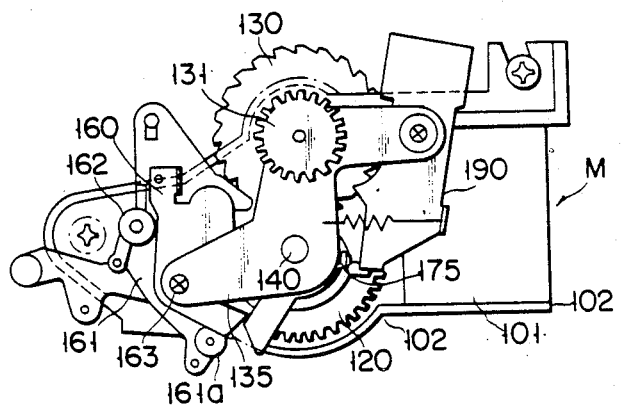
Figure 9A:
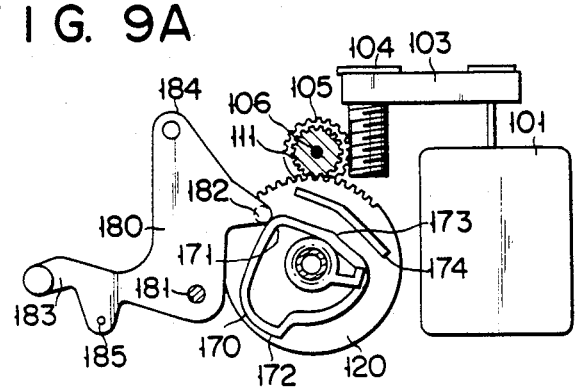
FIGS. 9A to 9F illustrate the operation of the mode switching device.
Figure 9B:
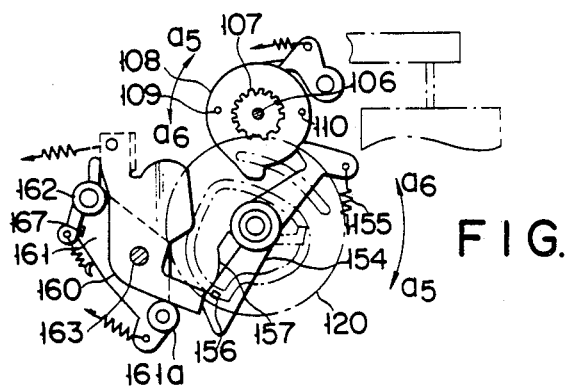
Figure 9C:
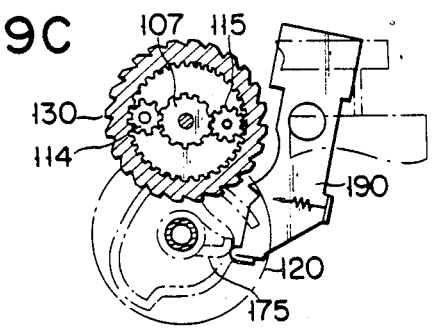
Figure 9D:
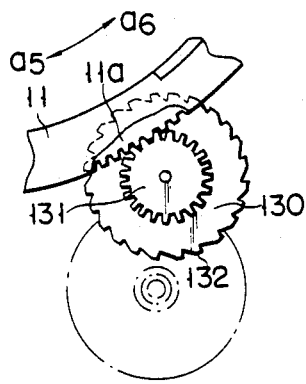
Figure 9E:
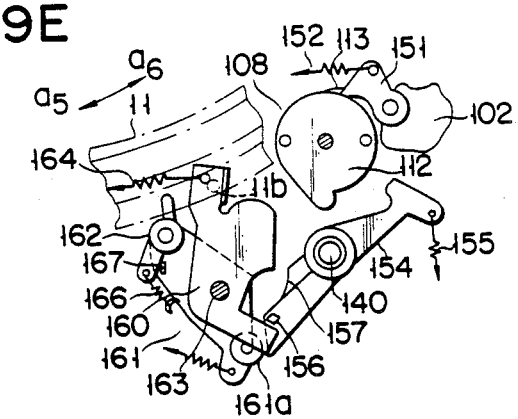
Figure 9F:
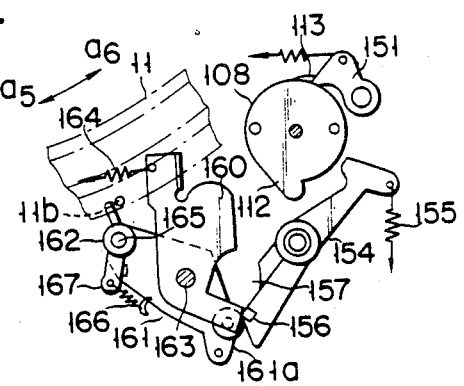
Figure 10A:
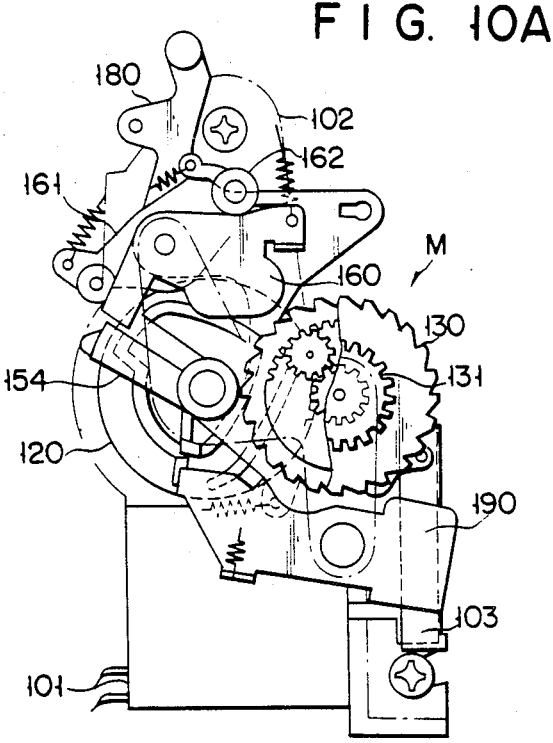
FIG. 10A is a plan view showing the substantially whole mechanism of the mode switching device.
Figure 10B:
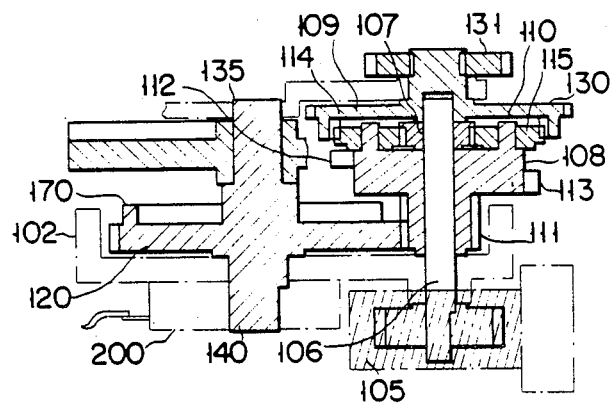
FIG. 10B is a sectional view showing the mode switching device.

Numeral 101 designates a loading motor which is held by a motor bracket 102 (FIGS. 8 and 10A). The motor bracket 102, which is formed of synthetic resin, supports the whole body of the mode switching device M, serving also as a mounting plate for mounting the device M on the chassis of the VTR. The rotatory force of the loading motor 101 is transmitted to a worm gear 104 rotatably mounted on the bracket 102 by means of a belt 103 stretched between the shaft of the motor 101 and the worm gear 104. The worm gear 104 is in mesh with a worm wheel 105 (FIG. 9A). The worm wheel 105 is coaxially attached to the lower end portion of a vertical shaft 106 which is rotatably mounted in the middle on the motor bracket 102 (FIGS. 9A and 10B). When the worm wheel 105 is rotated, the shaft 106 rotates together therewith, and a sun gear 107 coaxially attached to the upper end portion of the shaft 106 also rotates with the shaft 106 (FIGS. 9B, 9C and 10B). Further, a planet gear support device 108 forming a differential gear mechanism is mounted on the portion of the shaft 106 between the top side of the motor bracket 102 and the sun gear 107 so as to be able to rotate relatively to the shaft 106 (FIGS. 9B, 9E, 9F and 10B). The planet gear support device 108 has a small-diameter gear portion 111 formed on its under surface and in mesh with a mode cam 120 (FIGS. 9A and 10B). Further, first and second projections 112 and 113 constituting a cam are integrally formed at angular intervals of approximately 180° on the other periphery of the large-diameter portion of the planet gear support device 108. These first and second projections 112 and 113 are vertically shifted from each other (FIGS. 9E, 9F and 10B). Integrally formed on the top surface of the large-diameter portion of the planet gear support device 108, moreover, are support shafts 109 and 110 for rotatably supporting planet gears 114 and 115 (FIGS. 9B, 9C and 10B). The support shafts 109 and 110 are located at a predetermined distance from the shaft 106 to face each other along the diameter of the large-diameter portion of the planet gear support device 108, projecting from the top surface of the support device 108. The planet gears 114 and 115 rotatably supported by the support shafts 109 and 110, respectively, are in mesh with an internal gear 130 disposed over the support device 108 (FIGS. 9C and 10B). The internal gear 130 is rotatably supported by a bearing plate 135 fixed on the bracket 102. The rotatory force of the worm wheel 105 is transmitted to the loading disc 11 or the mode cam gear 120, depending on the relationships between the internal gear 130, the planet gears 114 and 115, and the planet gear support device 108. The internal gear 130 is fixed to the lower end of the shaft, the top end of which is coaxially fitted with a loading gear 131, and the middle portion of which is rotatably supported by the bearing plate 135 (FIGS. 8 and 10B). Further, a sawtooth gear portion 132 is formed on the outer periphery of the internal gear 130. The mode cam gear 120 is disposed on the top surface of the motor bracket 102, having its shaft 140 rotatably supported by the motor bracket 102 and the bearing plate 135 at both ends (FIGS. 8 and 10B). Here let it be supposed that the planet gear support device 108 is prevented from rotating by a lock arm 154 or a ratchet 151. In this case, the sun gear 107 rotates when the worm wheel 105 is rotated. The rotatory force of the sun gear 107 is transmitted to the planet gears 114 and 115. Since the planet gear support device 108 is locked, the planet gears 114 and 115 rotate on their own axes. Accordingly, the internal gear 130 rotates, and the loading gear 131, which is in mesh with the gear portion 11a of the loading disc 11, can drive the loading disc 11 to rotate (FIG. 9D). When the VTR is in the loading mode, the worm wheel 105 is driven to rotate around the shaft 106 in the direction of the arrow $a_6$ in FIG. 9A. Accordingly, the planet gears 114 and 115 to be rotated by the sun gear 107 rotate around their respective support shafts 109 and 110 in the direction of the arrow $a_5$ in FIG. 9C. As a result, the internal gear 130 and the loading gear 131 rotate on their axes in the direction of the arrow $a_5$ in FIG. 9D, thereby rotating the loading disc 11 in the direction of the arrow $a_6$ in FIG. 9D. In the loading mode, the planet gear support device 108 is locked by the lock arm 154. When the VTR is in the unloading mode, on the other hand, the worm wheel 105 is rotated in the opposite direction (direction of the arrow $a_5$) to the aforesaid direction. Accordingly, the internal gear 130 and the loading gear 131 rotate in the direction of the arrow $a_6$ to rotate the loading disc 11 in the direction of the arrow $a_5$. In the unloading mode, the planet gear support device 108 is locked and kept by the ratchet 151 from rotating in the direction of the arrow $a_5$ (FIG. 9E). The ratchet 151, as one of the lock means for locking and keeping the planet gear support device 108 from rotating in the loading and unloading modes, is rockably supported by a support portion formed on a part of the motor bracket 102 (FIG. 9E). The ratchet 151, capable of rotating on its own axis, is urged by a spring 152 so as to be able to engage the second projection 113 of the planet gear support device 108. As for the lock arm 154, it is rotatably mounted on the shaft 140 of the made cam gear 120. One end portion of the lock arm 154 is allowed to extend into the rotation orbit of the first projection 112 of the planet gear support device 108. The lock arm 154 is normally urged by a spring 155 to have its stopper portion removed from the rotation orbit. The rocking position of the lock arm 154, however, is controlled by a lock release arm 160 and lock restoring arms 161 and 162 (FIGS. 9B, 9E and 9F). Namely, a projected portion 156 formed on the other end portion of the lock arm 154 can run against the stopper portion of the lock release arm 160. The lock release arm 160 and the lock restoring arm 161 are rockably mounted on a shaft 163 on the motor bracket 102. The lock release arm 160 and the lock restoring arms 161 and 162 are driven by a projection 11b formed on the lower portion of the loading disc 11 (FIGS. 9E and 9F). Normally, as shown in FIG. 9B, the lock arm 154 locks and keeps the planet gear support device 108 from rotating in the direction of the arrow $a_6$. This is done because the lock release arm 160 restrains the lock arm 154 from being rocked by the spring 155. In the loading mode, when the loading disc 11 rotates to take the position shown in FIGS. 2 and 9E, the lock release arm 160 is driven by the projection 11b, as shown in FIG. 9E. Thus, the lock release arm 160 rocks in the direction of the arrow $a_5$ around the shaft 163. Accordingly, the lock arm 154 is pulled and disengaged from the first projection 112 by the spring 155. Thereupon, the loading of the VTR is completed. In the unloading mode, on the other hand, the loading disc 11 is driven to rotate in the direction of the arrow $a_5$ in FIG. 9F. At this time, the projection 11b of the loading disc 11 drives the lock restoring arm 161 to rock in the clockwise direction in FIG. 9F with the aid of the lock restoring arm 162. By the rocking of the lock restoring arm 161, a roller 161a (which may be omitted) attached to the lock restoring arm 161 drives the lock arm 154 to rock counterclockwise against the spring 155. As a result, the lock release arm 160, so far retained by the projected portion 156 of the lock arm 154, is rocked counterclockwise by a spring 164 to return to its original position. At the same time, the lock release arm 160 holds the lock arm 154 in the position where it locks the planet gear support device 108 (FIG. 9B). The lock restoring arm 161 directly drives the lock arm 154, while the lock restoring arm 162 transmits the force from the projection 11b of the loading disc 11 to the lock restoring arm 161. The lock restoring arm 162, along with the lock restoring arm 161, is coaxially rockably mounted on a shaft 165. The lock restoring arm 162 is normally urged in the counterclockwise direction in FIG. 9B by a spring 166, and is regulated by a projected portion 167 formed on the lock restoring arm 161. Accordingly, when the projection 11b of the loading disc 11 engages the lock restoring arm 162 while it is moving in the direction of the arrow $a_6$ in FIG. 9F, the lock restoring arm 162 can rock clockwise around the shaft 165 against the urging force of the spring 166. In this case, therefore, the force from the projection 11b is not transmitted to the lock restoring arm 161. When the projection 11b of the loading disc 11 is moved in the direction of the arrow $a_5$, however, the force from the projection 11b is transmitted to the lock restoring arm 161 through the lock restoring arm 162. This is done because the lock restoring arm 162 is restrained from rotating by the projected portion 167. To facilitate the movement of the roller 161a of the lock restoring arm 161, that is, the rotation of the lock restoring arm 161, a curved portion 157 is formed along the rotation orbit of the arm 161 on the end face of the lock arm 154 to face the roller 161a. By this, the lock restoring arm 162 is kept from being broken by the projection 11b at the start of unloading. Due to the formation of the curved portion 157, moreover, the design and location may enjoy improved degree of freedom. In the unloading mode, the loading motor 101 is rotated in the opposite direction as compared with the case of the loading mode. Accordingly, the sun gear 107 rocks in the direction of the arrow $a_5$ in FIG. 9C. In the unloading mode, moreover, the planet gear support device 108 is locked with respect to the clockwise direction by the ratchet 151, as shown in FIG. 9F. (Alternatively, the mode cam gear 120 may be locked. The locking method is not limited to the ratchet system, and may utilize the thrust and escape of brake, or the tightening and loosening directions of one-way clutch spring.) When the planet gear support device 108 is locked, the loading gear 131 is rotated in the counterclockwise direction in FIG. 9D, and the loading disc 11 is brought to the unloading position. The planet gear support device 108, the lock arm 154, and the lock restoring arms 161 and 162 constitute clutch means for transmitting the rotatory force of the motor to the loading gear 131 or the mode cam gear 120 which is subject to lighter load.

Figure 12A:
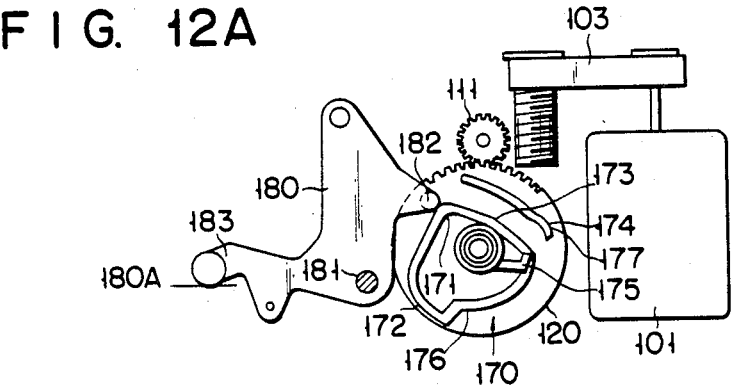
FIGS. 12A to 12C are plan views showing the mode switching device in various mode setting positions.
Figure 12B:
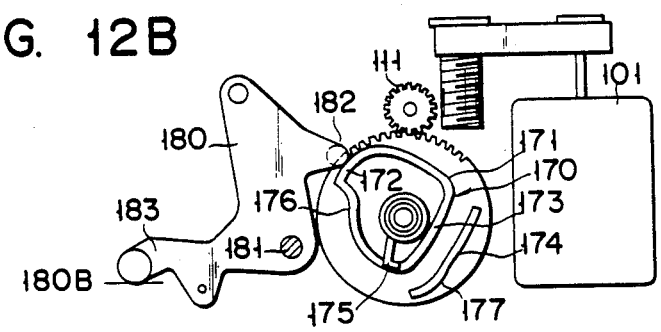
Figure 12C:
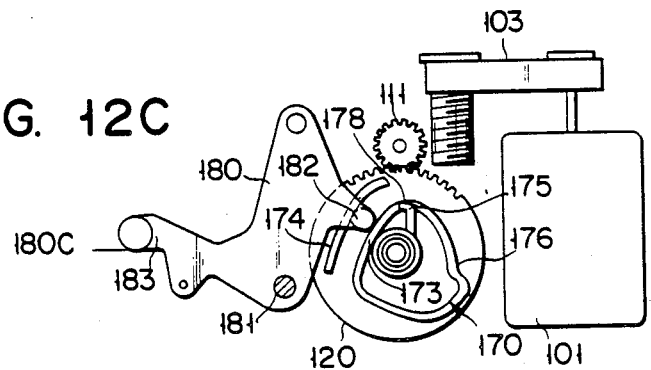
Figure 17:
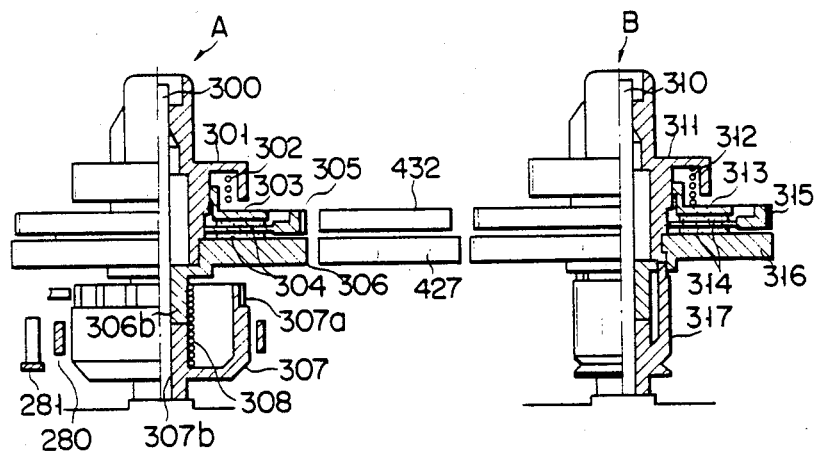

As described above, the mode switching device M can establish the loading and unloading modes in the VTR when the planet gear device 108 is locked. Referring now to FIGS. 9C and 9E, there will be described the way the mode switching device M operates when the lock arm 154 is released from the locking so that the planet gear support device 108 may rotate counterclockwise. The planet gear support device 108 is allowed to rotate counterclockwise when the loading of the VTR is completed. When the loading of the VTR is ended, the loading disc 11 cannot rock any more, so that load is imposed on the loading gear 131. When the sun gear 107 is rotated counterclockwise, therefore, the planet gears 114 and 115 spin on their respective support shafts 109 and 110 in the clockwise direction in FIG. 9C, and revolve counterclockwise along the inner periphery of the internal gear 130. The revolution of the planet gears 114 and 115 means rotation of the planet gear support device 108. The small-diameter gear portion 111 of the planet gear support device 108 is in mesh with the mode cam gear 120 (FIG. 9A). Therefore, if the loading motor 101 continues to rotate after the loading is ended, the mode cam gear 120 is rotated on its axis in the clockwise direction in FIG. 9A by the rotation of the planet gear support device 108. As shown in FIGS. 12A to 12C, the mode cam gear 120 can set the cam arm 180 in various positions according to the rotation angle. The mode cam gear 120 has a guide section 170 integrally projected from the top surface of the rotating body and intended to guide a trace pin 182 which protrudes from the free end of a cam arm 180. The guide section 170, which consists of a loop portion formed eccentrically as against the center of the mode cam gear 120 and a non-loop portion 174 separated from the loop portion, is formed like a partition wall, for example. The loop portion of the guide section 170 has a stop command position 171, a fast-forward/rewinding command position 172, and a recording/playback command position 173. Among these positions, the recording/playback command position 173 is located nearest to the center of the mode cam gear 120, whereas the fast-forward/rewinding command position 172 is located farthest from the center of the mode cam gear 120. Further, the stop command position 171 lies between the recording/playback command position 173 and the fast-forward/rewinding command position 172. The non-loop portion 174 of the guide section 170 is a portion to restrain the trace pin 182 of the cam arm 180 from being disengaged radially from the mode cam gear 120. The stop command position 171, the fast-forward/rewinding command position 172, and the recording/playback command position 173 are formed in different rotation angle positions of the mode cam gear 120. When the mode cam gear 120 is rotated clockwise, therefore, the cam arm 180 can successively take rotation angle positions 180A, 180B and 180C as shown in FIGS. 12A, 12B and 12C, respectively. Accordingly, the cam arm 180 can control the reel mount driving device L of the VTR by means of its first rocking end portion 183. When the cam arm 180 is in the rotation angle position 180A of FIG. 12A, the VTR is in the stop mode, so that the reel mount driving device L transmits the rotatory force of the idle wheel gear 427 and the idle gear 432 to neither of the reel mount devices A and B. When the cam arm 180 is in the rotation angle position 180B of FIG. 12B, the VTR is in the fast-forward or rewinding mode. In the fast-forward or rewinding mode, the reel mount driving device L is switched by the cam arm 180 so that the idle wheel gear 427 may come into contact with a reel mount wheel 306 or 316 (FIG. 17). When the reel mount driving device L is in the rotation angle position 180C of FIG. 12C, the VTR is in the recording or playback mode. In the recording or playback mode, the reel mount driving device L is switched by the cam arm 180 so that the idle gear 432 may come into contact with the reel gear 305 or 315 (FIG. 17).

In establishing the recording, playback, fast-forward, and rewinding modes, the mode cam gear 120 is normally rotated in a fixed direction (clockwise direction). In the position for the stop mode, the mode cam gear 120 rocks a reversal preventing lever 190 in the counterclockwise direction in FIG. 9C. Namely, the mode cam gear 120 has an integrally formed driving portion 175 for driving the reversal preventing lever 190. In all the operation modes but the stop mode, the reversal preventing lever 190 engages the gear portion 132 formed on the outer periphery of the internal gear 130. The reversal preventing lever 190 locks the internal gear 130 to lock the loading gear 131, thereby preventing the loading disc 11 from being reversed in the other operation modes than the stop mode. Further, the cam arm 180 can control the pinch roller driving device G (FIGS. 13 and 14) according to the rotation angle position. When the cam arm 180 is in the rotation angle position 180C, the pinch roller driving device G presses the pinch roller 12 against the capstan 31. When the cam arm 180 is in the rotation angle position 180A or 180B, on the other hand, the pinch roller driving device G separates the pinch roller 12 from the capstan 31.

Figure 11A:
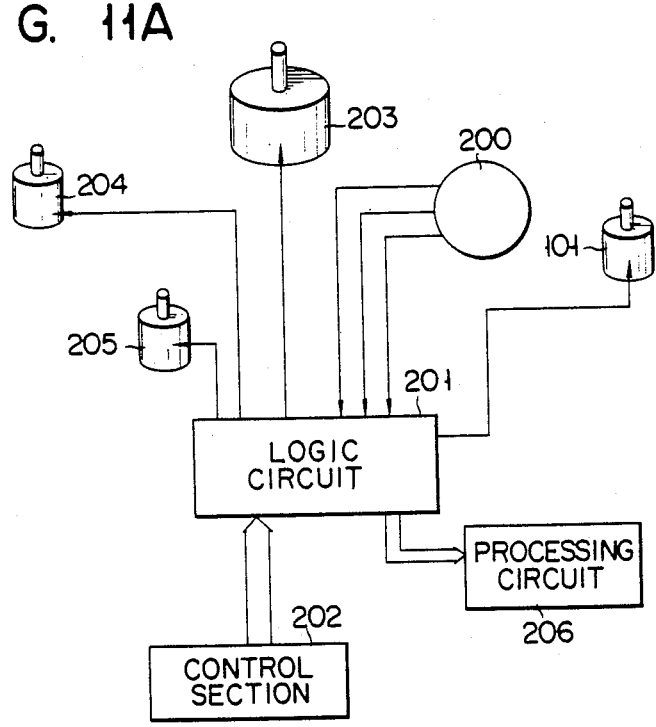
FIG. 11A is a schematic electric block diagram of the VTR.
Figure 11B:
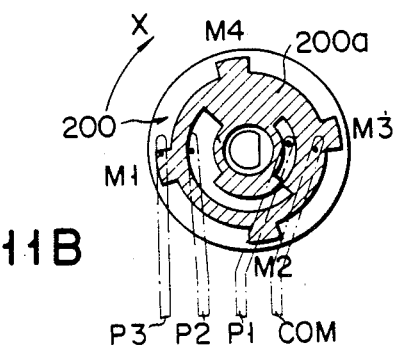
FIG. 11B is a plan view showing a cam switch.

The rotation angle position of the mode cam gear 120 is detected by a cam switch 200 shown in FIG. 11A, and the output of the cam gear 120 is applied to the input of a logic circuit for controlling the VTR. The cam switch 200 is attached to the lower portion of the motor bracket 102, and can provide an output corresponding to the rotation angle position of the mode cam gear 120. A conductive foil pattern 200a (hatched portion in FIG. 11B) in a suitable shape is formed on the surface of the cam switch 200. In this case, the conductive foil pattern 200a may be formed directly on the main body of the cam switch, or a printed substrate with the conductive foil pattern 200a threron may be attached to the cam switch body.

The conductive foil pattern 200a on the cam switch 200 is used for mode detection in the normal state, that is, except in case of a power failure. The conductive foil pattern 200a is fitted with rotation angle position detecting terminals P1, P2, P3 and COM arranged in suitable positions. In this case, the terminal COM is a power supply terminal through which a desired voltage is applied to the conductive foil pattern 200a. Accompanying the rotation (in the direction of an arrow X in FIG. 11B) of the cam switch 200, the terminals P1, P2 and P3 touch (ON) and leave (OFF) the conductive foil pattern 200a, while the terminal COM is kept in contact with the pattern 200a. Theoretically, therefore, $2^3$ or 8 modes can be obtained from the ON-OFF combinations of the terminals P1, P2 and P3 by suitably setting the positions of the conductive foil pattern 200a and the terminals P1, P2 and P3. As regards the arrangement shown in FIG. 11B, the following modes may be obtained.

(1) Stop mode: Only P3 is ON for M1.

(2) Rewinding and fast-forward modes: P1 and P3 are ON for M2.
(3) Recording pause mode: P2 and P3 are ON for M3.
(4) Recording and playback modes: P1 and P2 are ON for M4.
(5) Other mode: P1, P2 and P3 are all ON for M4.

The output of the mode cam switch 200 is applied to the input of a logic circuit 201, as shown in FIG. 11A. On the basis of input information from a control section 202 and output information from the mode cam switch 200, the logic circuit 201 delivers instruction signals corresponding to each operation mode to the loading motor 101, a rotating head motor 203, a capstan motor 204, a reel motor 205, and a video signal processing circuit 206. When supplied with a loading start signal, the logic circuit 201 causes the loading motor 101 to rotate. The loading motor 101 is stopped in response to a loading end signal which is given when the cam switch 200 delivers a stop mode signal (for both loading and unloading modes) after delivering some other mode signal following a preceding stop mode signal, that is, when the mode cam gear 120 has made one revolution.

Figure 13:
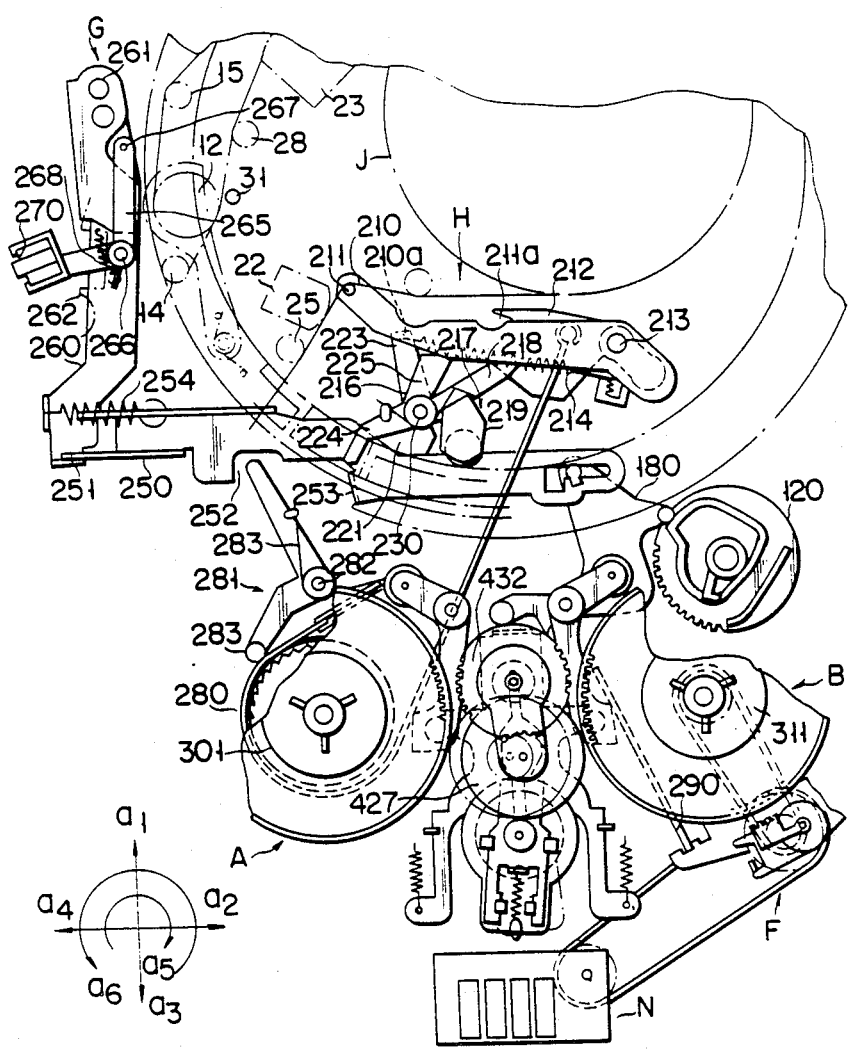
Figure 14:
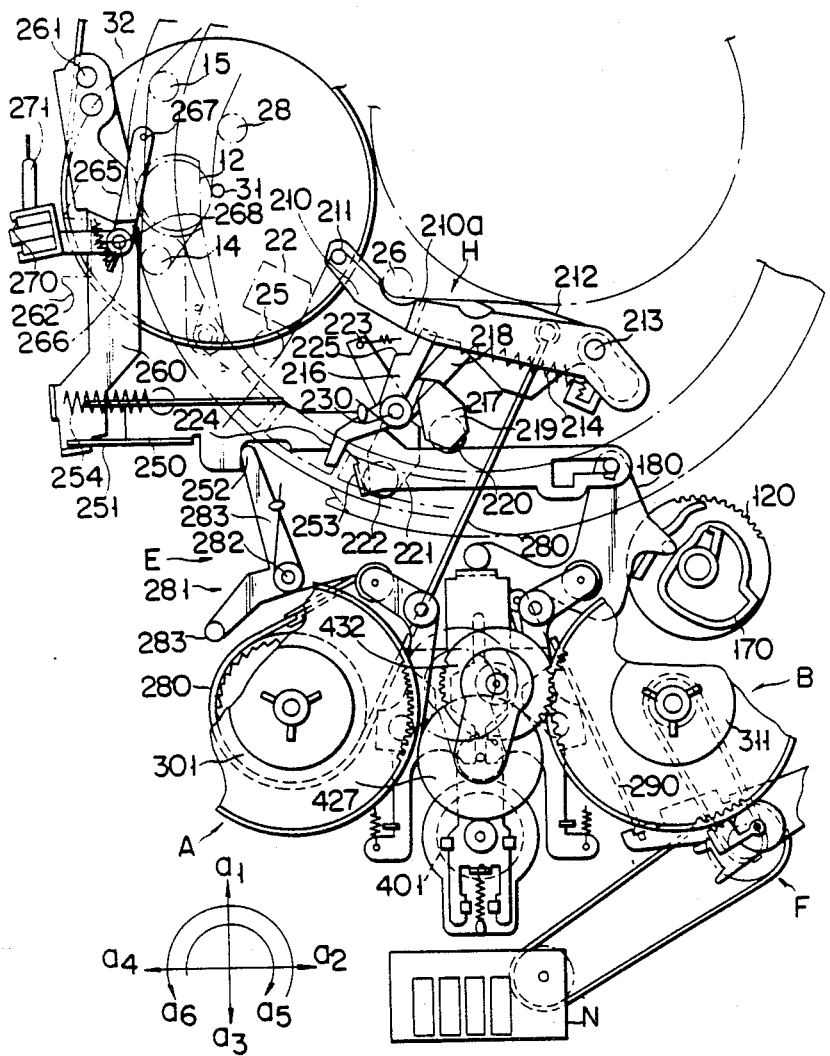

Namely, the mode cam gear 120 proceeds from the state of FIG. 12A to the states of FIGS. 12B and 12C immediately after the loading disc 11 is stopped, and then returns to the original state of FIG. 12A. In the meantime, the cam switch 200 delivers through the aforesaid terminals detection signals indicating that the cam arm 180 has taken all of the rotation angle positions 180A, 180B and 180C. Thereafter, the cam switch 200 gets itself ready for the next operation signal input. It will provide the following effects to obtain the loading mode end after allowing the mode cam gear 120 to make a turn in the loading mode of the VTR. As the cam arm 180 successively takes the rotation angle positions 180A, 180B and 180C shown in FIGS. 12A, 12B and 12C, it can drive the tension arm 210 (described in detail later with reference to FIGS. 13 to 15). When the loading is completed, the tension arm 210 acts in response to the action of the cam arm 180 to press the magnetic tape C once in the direction of an arrow $a_1$ in FIG. 13, and then to return to its stop position. This causes the pulled tape to slacken to a slight degree in the middle of the loading. In other words, the tension of the tape may be reduced by soft thrusting. As a result, the tape will be prevented from sticking to the cylinder after the loading or from being subjected to a drastic force to be stretched at the start of tape feed in the VTR. Moreover, the action of the tension arm 210 may secure the settlement position of an arm shift lever 216 as mentioned later. Namely, the tension arm 210 escapes once in the direction of the arrow $a_1$ to allow the arm shift lever 216 to rock to the settlement position (FIGS. 13 and 14). Conventionally, the loading end is identified by an output signal from a switch for detecting the loading position. According to this invention, however, the cam switch 200 doubles as the detecting switch to effect substantial simplification of the VTR in mechanical structure and in circuit arrangement.

As mentioned before, the mode switching device M can establish the recording, playback, fast-forward, and rewinding modes, as well as the loading and unloading modes, in the VTR. As regards the mode switching device M, various modifications may be effected. For example, a brake mechanism may be used as the means for locking or unlocking the planet gear support device 108 according to the mode of the VTR. Although the locking restoring arm 161 and the lock release arm 160 are used for controlling the lock arm 154 in the above-mentioned embodiment, the lock arm 154 may be driven directly by the projection of the loading disc 11. This also holds true of the ratchet 151. As for the planet gear support device 108, it may be braked only in one direction by using a pressure-contact brake. Further, although the rotatory force of the planet gear support device 108 is transmitted to the mode cam gear 120 in the above embodiment, these two members 108 and 120 may be formed coaxially and integrally without using the transmission system. Moreover, various modifications may be effected for the means for imposing load on the mode cam gear 120 in the loading mode to switch the mode cam gear 120 so that the rotatory force of the motor may be transmitted to the loading gear 131. For example, a brake shoe may be pressed against and removed from the mode cam gear 120. In this case, for example, the brake shoe is so set as to be pressed by the projection of the loading disc to be disengaged from the mode cam gear 120 when the loading is ended. Furthermore, the mode cam gear 120 may have a one-way clutch (using a ratched, for example) to allow the gear 120 to rotate only in one direction so that, in the unloading mode, the rotatory force of the motor, overloaded and rotated reversely, may naturally be transmitted to the loading gear.

As shown in FIGS. 12A to 12C, the guide section 170 of the mode cam gear 120 has a brake command portion 176 similar to the stop command position 171 and located between the command position 172 for establishing the fast-forward and rewinding modes and the command position 173 for establishing the recording and playback modes. The brake command portion 176 is used for creating a state resembling the stop mode to brake the reel mount devices A and B when the mode cam gear 120 establishes the recording or playback mode switching from the fast-forward or rewinding mode. Namely, the brake command portion 176 is intended to brake the reel mounts to prevent slack of the tape at mode changes. As mentioned later, the mode cam gear 120 can control the reel mount driving device L, supplying the same with input information through the cam arm 180. The brake command portion 176 may be obtained by forming on the guide section 170 a portion which suddenly projects from the fast-forward-/rewinding command position toward the center side. The portion 176 has a function to cause the trace pin 182 of the cam arm 180 temporarily to drive about the mode cam gear 120 in the direction of the arrow $a_5$ in FIG. 13. Namely, in switching from the fast-forward or rewinding mode to the next mode, the trace pin 182 temporarily increases the rotation speed of the mode cam gear 120, utilizing the spring force applied to the cam arm 180. The increase of the speed provides an effect (loading disc position retaining effect) to push back the loading disc in the loading direction by means of the differential mechanism.

On the guide section 170 of the mode cam gear 120, a pause command position 178 is provided immediately before the recording/playback command position 173. When a pause signal from the operating portion is supplied, the mode cam gear 120 takes a position where the pause command position 178 sets the trace pin 182 in the same position as the stop command position 171 does. The pause command position 178 is set near the recording/playback command position 173 for quicker response.

Formed on the non-loop guide portion 174 of the mode cam gear 120, on the other hand, is a load portion 177 to provide heavier load to drive the trace pin 177. The load portion 177 is so located as to meet the trace pin 182 before the recording/playback command position 173 is guided by the trace pin 182. The load portion 177 is obtained by forming a trace surface with a locally increased pressure angle on the guide portion 174 to drive the trace pin 182. As described before, the cam arm 180 is loaded with a force to operate the pinch roller driving device G, a force to drive the tape tension control device H, and a force to provide each operation mode. When the trace pin 182 reaches the load portion or trace surface 177, the increased pressure angle of the trace surface 177 increases the driving load on the mode cam gear 120. As mentioned before, the mechanism shown in FIGS. 12A to 12C constitutes the clutch means or switching means for transmitting the rotatory force of the motor to the loading gear 131 or the mode cam gear 120 which is subjected to lighter load. If the loading disc 11 is set incompletely, the increase of the load on the mode cam gear 120 makes the driving load on the loading gear 131 smaller than the load on the mode cam gear 120. Accordingly, the loading gear 131 is preferentially rotated to drive the loading disc 11 in the loading direction as in the loading mode. It is not until the loading disc 11 comes to the loading end to become unable to rotate any more and to stop the loading gear 131 from rotating that the rotatory force of the motor is thoroughly transmitted to the mode cam gear 120. Thus, the mode cam gear 120 is rotated to lead the trace pin 182 to the recording/playback command position 173. By this action, the loading disc 11, in the recording or playback mode, is surely be set in position. In some cases, the loading disc 11 is subjected to the tape tension to be pulled softly in the unloading direction in the rewinding or fast-forward mode of the VTR. If the recording or playback operation is performed in such a state, the pressure-contact position of the pinch roller 12 (provided on the loading disc 11 by means of the lever 13) will be shifted to exert bad influences on the performance of the VTR, such as unstable tape feed, damage to the tape, etc. According to the mechanism of the invention, however, the loading disc 11 never fails to be held stably in the normal position by the load portion 177 even if it is set only incompletely, thus producing no adverse effects.

Now there will be described the relationships between the mode switching device M, the pinch roller driving device G, and the tape tension control device H. FIG. 13 shows a state in which the VTR is set in the fast-forward or rewinding mode, and FIG. 14 shows a state in which the VTR is set in the recording or playback mode. The cam arm 180 is coupled to one end portion of a cam link 250, with a projection of the cam arm 180 loosely fitted in a slot formed in the one end portion of the cam link 250. Slidably attached to the chassis, the cam link 250 is slidden in the directions of arrows $a_4$ and $a_2$ in FIG. 13 according to the rotation angle of the cam arm 180. One end portion of a pinch lock lever 260 of the pinch roller driving device G engages the other end portion 251 of the cam link 250. The cam link 250 pulls the rocking end side of the pinch lock lever 260 in the direction of the arrow $a_2$ ($a_6$) in FIG. 13 with the aid of a spring 254 stretched between the cam link 250 and the pinch lock lever 260. The pinch lock lever 260 is mounted on a pinch lock fixing plate 262 by means of a shaft 261 at the other end portion thereof so as to be able to rock in the directions of the arrows $a_5$ and $a_6$. When pulled in the direction of the arrow $a_2$ by the cam link 250 with the aid of the spring 254, the pinch lock lever 260 presses the casing portion of the pinch roller 12 in the direction of the arrow $a_2$ (FIG. 14). The pinch lock lever 260 is fitted with a tape slack detecting mechanism. A slack lever 265 for detecting tape slack is mounted on a shaft 266 so as to be able to rock around the same in the directions of the arrows $a_5$ and $a_6$. A pin 267 capable of coming into contact with the tape protrudes downward from the distal end of the slack lever 265. The slack lever 265 is normally urged to lock in the direction of the arrow $a_5$ by a spring 268. The spring 268 is stretched, for example, between part of the slack lever 265 and the pinch lock fixing plate 262. In the other modes than the recording and playback modes, the pinch lock lever 260 is rocked in the direction of the arrow $a_5$ by the pinch lock spring 254 and the cam link 250, and the shaft 266 is moved in the direction of the arrow $a_4$. The slack lever 265 is rocked in the direction of the arrow $a_6$ with a projected portion at one end thereof pressed by the pinch lock fixing plate 262. In the recording and playback modes, on the other hand, the cam link 250 is pulled in the direction of the arrow $a_2$ by the cam arm 180, the pinch lock lever 260 is rocked in the direction of the arrow $a_6$ by the pinch lock spring 254, and the shaft 266 is moved in the direction of the arrow $a_2$. Since the projected portion of the slack lever 265 is disengaged from the pinch lock fixing plate 262, the slack lever 265 is rocked in the direction of the arrow $a_5$ by the spring 268, and then stops when the pin 267 abuts against the tape C. If the tape C is slackened, then the slack lever 265 will further rock in the direction of the arrow $a_5$. A magnet 270 can rock together with the slack lever 265 in the direction of the arrow $a_5$. The magnet 270 is retained by a magnet retaining arm formed integrally with the slack lever 265. If the tape is slackened when the slack lever 265 is in the position shown in FIG. 14, the slack lever 265 rocks in the direction of the arrow $a_5$, and the magnet 270 moves onto a reed switch 271 attached to the pinch lock fixing plate 262. As a result, the reed switch 271 is turned on, and thus the tape slack is detected electrically. In this case, the tape is unduly slackened or cut, so that the VTR is stopped.

Figure 15:
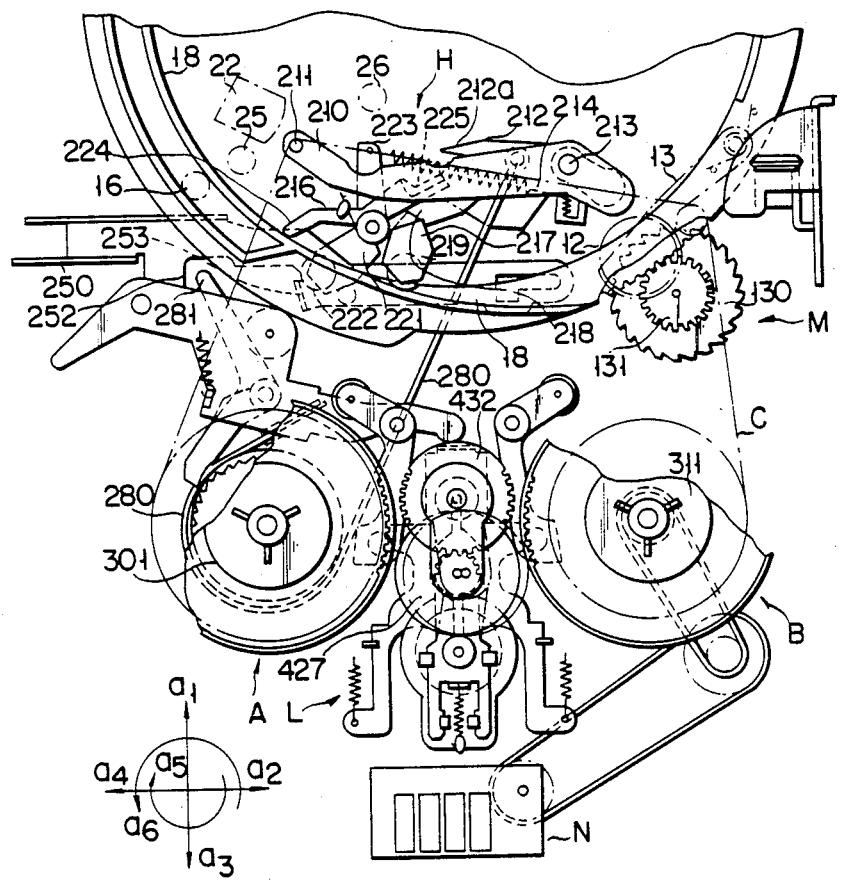

The cam link 250 can also drive the tape tension control device H. When the VTR is in the loading mode, the tape tension control device H is driven by the cam surface 18 of the loading disc 11, the cam portion 19, and the cam link 250, and takes the position shown in FIG. 2. Referring now to FIG. 14, there will be described the tape tension control device H. The tape tension control device H includes an arm portion 224 driven by the loading disc 11 and another arm portion 225 capable of regulating the tension arm 210. A tension sub-arm 217 and an arm shift lever 216 are urged by a spring 227 to rock in opposite directions. FIG. 15 shows a state in the middle of loading. FIGS. 1 and 2 show the states before the start and after the completion of the loading of the VTR, respectively. In the middle of the loading, the tension sub-arm 217 is rocked in the direction of the arrow $a_6$ around a shaft 230 by the cam surface 18 of the loading disc 11. Accordingly, an arm portion 218 of the tension sub-arm 217 causes a tension lever 212 to rotate in the direction of the arrow $a_5$ around a shaft 213.

FIGS. 13 and 14 show the state in which the tape tension control device H is controlled by the cam link 250. FIG. 14 shows the recording or playback mode. In this mode, the cam link 250 moves in the direction of the arrow $a_2$, and pulls a roller 222 on an arm portion 221 of the tension sub-arm 217 by means of an engaging portion 253 thereof. Accordingly, a pin on the arm portion 218 of the tension sub-arm 217 is removed from an engaging portion 212a of the tension lever 212. Further, an arm portion 223 of the tension sub-arm 217 stretches a tension spring 214. Thus, the tension arm 210 is elastically urged to rock in the direction of the arrow $a_5$. At this time, the tension lever 212 pulls one end of the band brake 280.

The band brake 280 can give the reel mount 301 a braking force. Namely, if the tension lever 212 rocks in the direction of the arrow $a_5$ (if the tape is slackened), the band brake 280 acts on the reel mount 301 to restrain the tape supply. If the tension lever 218 rocks in the direction of the arrow $a_6$, the band brake 280 is taken off the reel mount 301. Accordingly, the tension lever 212 and the tension arm 210 are balanced by the tension of the tape C and the tensile force of the tension spring 214, and can detect the slack of the tape C and pull or relax the band brake 280. FIG. 13 shows the fast-forward or rewinding mode. In this mode, the cam link 250 moves in the direction of the arrow $a_4$. Accordingly, the tension sub-arm 217 is rotated in the direction of the arrow $a_4$ around the shaft 230 by the tension spring 214, and a roller 220 on an arm portion 219 returns in the direction to abut against the inner peripheral surface of the loading disc 11. Then, the arm portion 218 of the tension sub-arm 217 causes by means of its pin the tension lever 212 to rock in the direction of the arrow $a_6$ around the shaft 213. At the same time, a bent portion 210a of the tension arm 210 faces a step portion of an arm portion 225 of the arm shift lever 216. The arm portion 225 of the arm shift lever 216 restrains by its L-shaped step portion the tension arm 210 from unduly rocking in the direction of the arrow $a_6$. In the fast-forward or rewinding mode, as described above, the rocking position of the tension arm 210 is regulated.

This is done because the tape winding angle of the cylinder J need be reduced to lighten the tape feed load in the fast-forward or rewinding mode, and in order to prevent a tension pole 211 from shifting its position to displace the tape feed path due to a great force from the tape applied to the tension pole 211 when the tape is fed at high speed. By restraining the displacement of the tape feed path in this manner, the tape edges may be prevented from being distorted or damaged by poles and other members, and stable picture may be obtained in the fast playback mode.

When the VTR is in the loading mode, the tension arm 210 proceeds from the position shown in FIG. 1 to the position shown in FIG. 2, and the mode cam gear 120 makes one revolution and then stops, as mentioned before in conjunction with the description of the logic circuit. Namely, the tension arm 210 moves from the position shown in FIG. 1 to the position shown in FIGS. 2 and 15, then takes the position shown in FIG. 14, and returns to and settles in the position of FIG. 2. As the tension arm 210 moves from the position of FIG. 2 to the position of FIG. 14, the arm shift lever 216 rocks in the direction of the arrow $a_6$ with its arm portion 225 made ready to regulate the position of the bent portion 210a of the tension arm 210. Subsequently, when the tension arm 210 returns to the position of FIG. 2, it is held in a fixed position with its bent portion 210a regulated in position by the arm portion 225. This fixed position is located nearer to the position of FIG. 14 than the position reached immediately after the loading end when the tension arm 210 is moved from the position of FIG. 15 to the position of FIG. 2. Thus, the fixed position may be maintained without respect to the design or assembly accuracy of the components. This is quite essential to the performance of the VTR, since that fixed position serves also as the aforementioned tension arm position for the rewinding and fast playback modes.

The arm portion 224 of the arm shift lever 216 is so set as to drop into the cam portion 19 (FIGS. 2 and 13).

This is done in order that, at the start of unloading, the loading disc 11 may suddenly drive the arm shift lever 216 to remove the arm portion 225 quickly from the tension arm 210.

The mode switching device M can also control the brake device E on the side of the supply reel mount device A with the aid of the cam link 250. The brake device E is formed of a soft brake lever 281 which is L-shaped and rockably mounted on a shaft 282 at the middle portion. One end portion of the soft brake lever 281 can engage a notch portion 252 of the cam link 250. When the mode cam gear 120 is in the position for the playback/recording mode (FIG. 14), the cam link 250 is pulled in the direction of the arrow $a_2$. Accordingly, the soft brake lever 281 is rocked around the shaft 282 in the direction of the arrow $a_5$ against the urging force of a spring 283. As a result, a pin 284 at the other end of the soft brake lever 281 is disengaged from the band brake 280. This means that the reel mount 301 is braked by the band brake 280 in the recording/playback mode, as mentioned before. When the mode cam gear 120 is in the position for the fast-forward/rewinding mode (FIG. 13), the cam link 250 is moved in the direction of the arrow $a_4$. Accordingly, the soft brake lever 281 is rotated in the direction of the arrow $a_6$ by the force of the spring 283 to press its pin 284 against the band brake 280. In the fast-forward, rewinding, and fast playback (picture search) modes, the tension arm 210 is returned by a short distance, so that the band brake 280 ceases to be operative. Thus, proper brake torque is imposed on the supply reel mount 301 by applying the soft brake lever 281 to the same. Further, the tape may be prevented from being unrolled excessively by the moment of inertia of the supply reel mount 301. Also, the eject brake lever 460 (FIGS. 1 and 2) is rockably mounted on the shaft 282 supporting the soft brake lever 281. The eject brake lever 460 constitutes means for preventing unnecessary rotation of the supply reel mount 301 by utilizing the rotation of the loading disc 11 in the unloading mode of the VTR.

Figure 16:
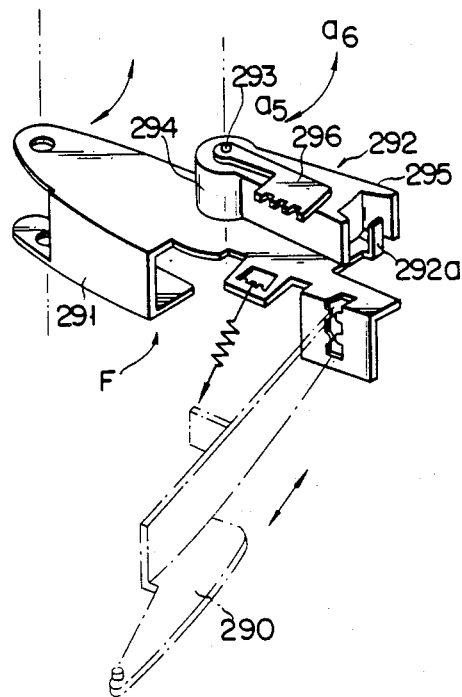

Moreover, the mode switching device M can control the brake device F on the side of the take-up reel mount device B. In the brake device F, one end of a brake link 290 is attached to the cam arm 180 driven by the mode cam gear 120. The other end of the brake link 290 is attached to a reverse brake lever 291. Thus, as the cam arm 180 is shifted to the position for the fast-forward or rewinding mode (FIG. 13), it pushes the reverse brake lever 291 in the direction of the arrow $a_6$ to prevent the brake device F from acting on the take-up reel mount device B. As the cam arm 180 is shifted to the position for the recording or playback mode (FIG. 14), on the other hand, it pulls the reverse brake lever 291 in the direction of the arrow $a_1$. Thus, the brake device F is allowed to act on the take-up reel mount device B. As shown in FIG. 16, the brake device F has a gear lock lever 292.

The gear lock lever 292 is rockably mounted on a shaft 293 protruding from the reverse brake lever 291.

The gear lock lever 292 includes a contact portion 294 which softly touches the rotating peripheral surface of the reel mount device B to detect the direction of rotation of the reel mount 311. The gear lock lever 292 further includes a rocking portion 295 and a gear lock portion 296 formed integrally. The gear lock portion 296 can engage the reel gear of the reel mount device B to put load on the reel mount 311 when the gear lock lever 295 is rocked in the direction of the arrow $a_5$. The reel mount devices A and B are shown in detail in FIG. 17. The gear lock lever 292 can rock within a suitable range of rotation angle on the top surface of the reverse brake lever 291. This can be done because the reverse brake lever 291 has a stopper 292a which is located between two prongs of the forked free end of the gear lock lever 292 so as to regulate the rocking range of the lever 292. The brake device F can put load on the take-up reel mount device B only when the VTR is in the reverse playback mode. In the normal or forward playback mode, the take-up reel mount 311 drives the gear lock lever 292 by means of the contact portion 294 so that the gear lock lever 292 may not engage the reel gear. In the reverse playback mode, the gear lock lever 292 engages the reel gear to put load on the take-up reel mount 311 lest the tape should excessively be discharged from the side of the take-up reel mount 311. In the reverse playback mode, moreover, the capstan 31 is driven in the opposite direction as compared with the case of the normal playback mode, and the idle gear 432 drives the take-up reel mount 311. As described above, the mode switching device M can control the brake device F on the side of the take-up reel mount device B between operating and nonoperating states.

FIG. 17 shows the supply reel mount device A and the take-up reel mount device B. The supply reel device A is composed of the supply reel mount 301 coaxially rotatably mounted on a reel mount post 300, a reverse spring 302 for clutch, a clutch plate 303, a felt 304, the reel gear 305, the reel mount wheel 306, a brake wheel 307, and a reel clutch spring 308 for one-way clutch. The band brake 280 acts on the flat outer peripheral surface of the brake wheel 307 of the reel mount device A. Further, the pin on the soft brake lever 281 acts on the outer peripheral side of the band brake 280 to restrain the back tension of the supply reel mount 306 (in the fast-forward, rewinding, or picture search mode). Formed on the outer peripheral surface of the brake wheel 307 is a pawl portion 307a on which the eject brake lever 460 (FIG. 1) acts when the VTR is in the unloading mode. The eject brake lever 460 is a lever to prevent the supply reel mount 301 from reversing in the unloading mode.

The supply reel mount device A is driven to rotate by the idle gear 432 or the idle wheel gear 427. The idle gear 432 is so set as to be able to be in mesh with the reel gear 305, while the idle wheel gear 427 is so set as to come into contact with the reel mount wheel 306 to transmit its rotatory force thereto. In the supply reel mount device A, the reel clutch spring 308 is wound around both the outer peripheral surface of an internal shaft 307b of the brake wheel 307 and the outer peripheral surface of a shaft portion 306b of the reel mount wheel 306.

In this case, the reel clutch spring 308 is wound in such a direction that it is tightened when the reel mount 301 rotates clockwise (in the direction of the arrow $a_5$ in FIGS. 1 and 2). When the reel mount wheel 306 or the reel gear 305 is driven to rotate clockwise, therefore, its rotatory force is transmitted to the brake wheel 307. Accordingly, the reel mount 301, the reel mount wheel 306, the reel gear 305, and the brake wheel 307 rotate all together in the playback mode, for example. Thus, the braking effect of the band brake 280 may be obtained through the brake wheel 307. However, when the reel mount 301 is rotated counterclockwise, that is, when the VTR is in the rewinding or reverse playback mode, a frictional force in the direction to loosen the clutch spring 308 is transmitted from the reel mount wheel 306 to the clutch spring 308. As a result, the clutch spring 308 ceases to transmit the force from the reel mount wheel 306 to the brake wheel 307. In the reverse playback mode, therefore, the rotation of the reel mount 301 (in the counterclockwise direction) is not affected by the action of the band brake 280 on the side of the brake wheel 307. In this case, moreover, if the reel mount 301 is urged to rotate clockwise by back tension, the braking effect may be provided because rotation caused by back tension should be transmitted to the brake wheel 307, as mentioned before. Namely, the force of the band brake 280 is nullified in the reverse playback mode, whereas the band brake 280 can exhibit its braking effect to control the tape tension in the normal playback mode. Also in the loading and unloading modes, the soft brake lever 281 and the eject brake lever 460 produce the braking effect.

The take-up reel mount device B is composed of the take-up reel mount 311 coaxially rotatably mounted on a reel mount post 301, a play spring 312 for clutch, a clutch plate 313, a felt 314, the reel gear 315, the reel mount wheel 316, and a reel mount pulley 317.

The rotation of the reel mount pulley 317 is transmitted to the counter N shown in FIG. 1.

The brake device F described in conjunction with FIG. 16 acts on the reel gear 315.

Figure 18A:
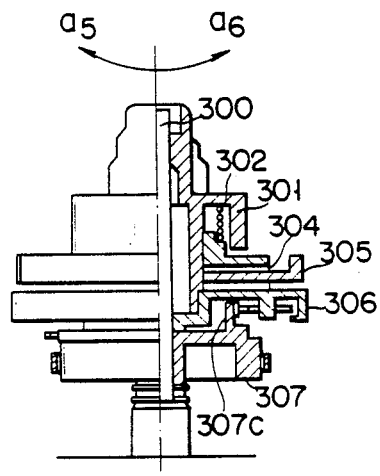
FIGS. 18A and 18B are a partially broken front view and a sectional view, respectively, showing the supply reel mount.
Figure 18B:
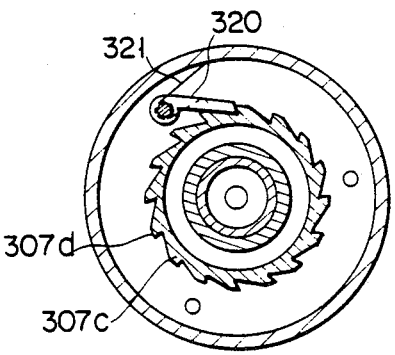

In the supply reel mount device A, the one-way clutch means may be constructed as shown in FIGS. 18A and 18B. In this case, a ratchet structure is substituted for the one-way clutch spring. In this ratchet structure, a ratchet 320 is provided as a mechanism for transmitting the rotatory force from the reel mount wheel 306 to the brake wheel 307, and a pawl portion 307d is formed on the outer periphery of an internal shaft 307c of the brake wheel 307. Thus, the ratchet structure may have the same function as the clutch spring 308.

In this case, the ratchet 320 is urged to rock toward the pawl portion 307d by a spring 321. Thus, the rotatory force on the side of the reel mount 302 is transmitted to the brake wheel 307 in the playback, recording, fast-forward, and fast playback modes. In the rewinding and reverse playback modes, however, the rotatory force from the side of the reel mount 302 is never transmitted to the brake wheel 307. Especially in the reverse playback mode, therefore, the mode cam gear 120 is in the position for the playback mode, and the tension arm 210 is in the same rocking position as in the normal playback mode. In this case, the band brake 280 acts on the brake wheel 307. Then, the reverse playback mode is established when the capstan is rotated in the reverse direction. At this time, the influence of the band brake 280, which acts on the brake wheel 307, on the counterclockwise rotation may be eliminated owing to the use of the one-way clutch means. Thus, the tension arm 210 can keep the magnetic tape always in the normal tape feed path. This ensures stable location of the tape feed path and reproduction of stable pictures both in the reverse and normal playback modes.

Figure 19A:
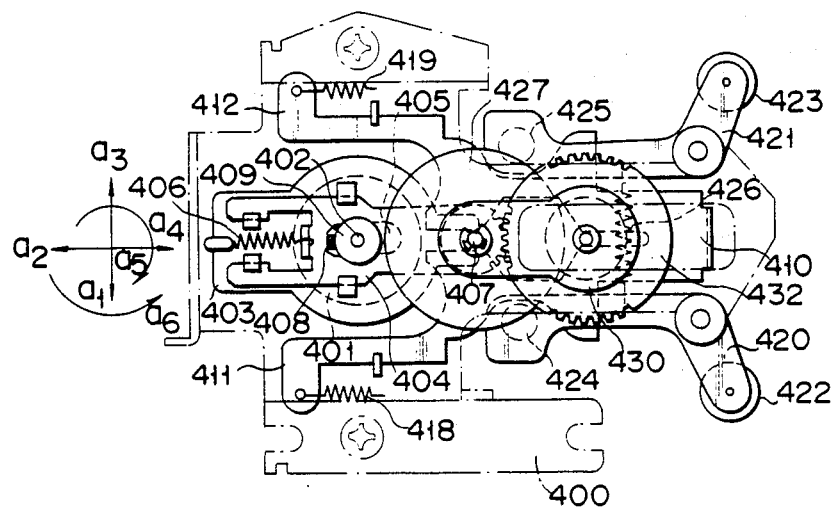
FIGS. 19A and 19B are a plan view and a sectional view, respectively, showing the reel mount driving device.
Figure 19B:
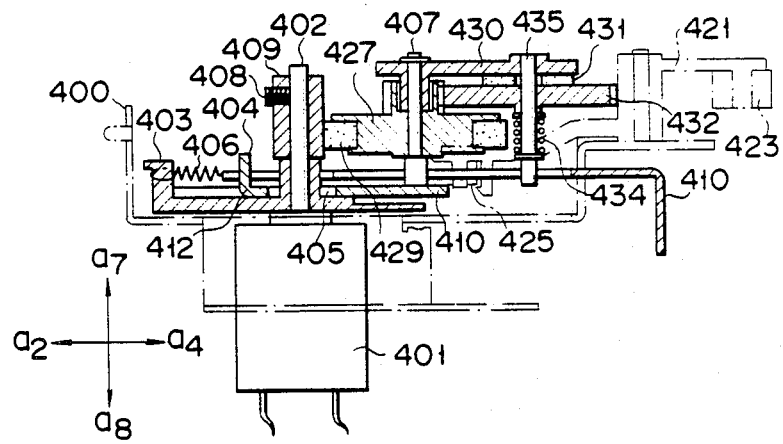

Now the reel mount driving device L will be described in detail. FIGS. 19A and 19B are a top view and a side sectional view, respectively, of the reel mount driving device L. Referring to FIGS. 20A, 20B and 20C, there will be described the construction of the reel mount driving device L shown in FIGS. 19A and 19B. Like reference numerals refer to like portions throughout these several views.

Referring first to FIG. 20A, numeral 400 designates a reel drive chassis. The reel motor 401 is attached to the under surface of the reel drive chassis 400. A rotating shaft 402 of the reel motor 401 protrudes upward, i.e., in the direction perpendicular to the plane of the drawing of FIG. 20A, from the reel drive chassis 400. An idle slide holder 403 is disposed over the top surface of the reel drive chassis 400 so as to be able to rock in the directions of the arrows $a_5$ and $a_6$ around the rotating shaft 402. An idle slider 404 is disposed on the top surface of the idle slide holder 403. The idle slider 404 can slide in the directions of the arrows $a_2$ and $a_4$, engaged with a guide portion on the idle slide holder 403. Normally, the idle slider 404 is urged to slide in the direction of the arrow $a_2$ by a spring 406. Further, the idle slider 404 is provided with a post 407 protruding upward. A reel motor pulley 409 is attached to the rotating shaft 402 by means of a setscrew 408.

Referring then to FIG. 20B, a slider 410, having wing strips 411 and 412 forming a configuration bisymmetrical with respect to a line l passing through the rotating shaft 402 and extending along the direction of the arrow $a_2$ or $a_4$, is disposed over the top surface of the reel drive chassis 400 so as to be able to slide in the directions of the arrows $a_2$ and $a_4$. The slider 410 has a post position guide portion 413 and brake lever position guide notch portions 417. The post position guide portion 413 is formed of an opening 414 formed substantially in the center of the slider 410, and slits 415 and 416 extending from the opening 414 along the line l. As for the brake lever position guide portions 417, they are formed by curvedly notching parts of the respective outer peripheral end faces of the wing strips 411 and 412. The slider 410 is normally urged to slide in the direction of the arrow $a_4$ by tension springs 418 and 419 stretched between the reel drive chassis 400 and the wing strips 411 and 412, respectively.

The reel drive chassis 400 is further mounted with substantially L-shaped brake levers 420 and 421 as main brakes for the reel mounts. These brake levers 420 and 421, forming a configuration bisymmetrical with respect to the line l, are pivotally mounted on the chassis 400 substantially at their respective centers so as to be able to rock in the directions of the arrows $a_5$ and $a_6$. The respective one sides of the brake levers 420 and 421 extend in directions to go away from each other, having rubber tires 422 and 423 fixed to the under surfaces of their respective end portions. The respective other sides of the brake levers 420 and 421, on the other hand, extend over the slider 410 along the line l, having rollers 424 and 425 to engage the brake lever position guide portions 417 attached to the under surfaces of their respective end portions. The brake levers 420 and 421 are normally urged to rock in the directions of the arrows $a_5$ and $a_6$, respectively, by a spring 426 stretched between the respective other sides of these brake levers.

Referring now to FIG. 20C, the idle wheel gear 427 is pivotally mounted on the post 407 so as to be able to rotate thereon. A pinion 428 is coaxially formed on the top surface of the idle wheel gear 427, and a rubber tire 429 is attached to the outer peripheral side face of the gear 427. The rubber tire 429 is pressed against the reel motor pulley 409, with the idle slider 404 urged to slide in the direction of the arrow $a_2$ by the spring 406, as mentioned before.

Further, an idle holder 430 is mounted on the post 407 so as to be able to rock in the directions of the arrows $a_5$ and $a_6$. The idle gear 432 is provided under the idle holder 430 with an idle felt 431 between them so as to be able to rotate in the directions of the arrows $a_5$ and $a_6$ around a post 435 as a pivot. A tooth-shaped surface 433 of the idle gear 432 is in mesh with the pinion 428 on the idle wheel gear 427. The idle gear 432 is normally urged in the direction of the arrow $a_7$ (FIG. 19B) by a spring 434 to abut against the felt 431.

In such an arrangement, when the slider 410 is slidden in the direction of the arrow $a_4$, the post 407 is located in the slit 415, and the post 435 is located in the opening 414. In this case, if the rotating direction of the rotating shaft 402 of the reel motor 401 is set in the direction of the arrow $a_6$, the idle holder 430 is rocked in the direction of the arrow $a_5$ around the post 407 by means of the idle wheel gear 427, and the idle gear 432 is brought in mesh with the reel gear 315 of the take-up reel mount device B. At the same time, the idle gear 432 is rotated to drive the reel gear 315, thereby establishing the recording or playback mode.

If the rotating direction of the rotating shaft 402 is set in the direction of the arrow $a_5$, on the other hand, the idle holder 430 rocks in the direction of the arrow $a_6$, and the reel gear 305 of the supply reel mount device A is driven by the idle gear 432 to establish the reverse playback mode.

Further, if the slider 410 is slidden in the direction of the arrow $a_2$ against the urging force of the spring 419, the post 407 is located in the opening 414, and the post 435 is located in the slit 416. In this case, the idle slide holder 403 rocks in the direction of the arrow $a_5$ or $a_6$ around the post 435 according to the rotating direction of the reel motor pulley 409. As a result, the rubber tire 429 is caused to abut against the reel mount wheel 316 of the take-up reel mount device B or the reel mount wheel 306 of the supply reel mount device A to drive the same to rotate, thereby establishing the fast-forward or rewinding mode.

By locating the slider 410 as shown in FIG. 20B, the posts 407 and 435 are located in the slits 415 and 416, respectively, and the post 435 is restrained from rocking by the slit 416. Thus established is the stop mode in which neither the take-up reel mount device B nor the supply reel mount device A is driven.

Thus, according to this invention, the idle wheel gear 427 and the idle gear 432 have their respective rotating shafts (posts 407 and 435) capable of moving independently, these rotating shafts being selectively made fixed and movable, respectively, so that the idle wheel gear 428 or the idle gear 432 with its rotating shaft movable is brought into contact with the take-up reel mount device A or the supply reel mount device B according to the rotating direction of the reel motor 401 to drive the same. Namely, the various operation modes of the VTR can be established by means of a single locating member, so that the VTR can greatly be simplified in construction as compared with the prior art VTR in which a plurality of rotating bodies are driven by means of a plurality of locating members.

Further, since the driving system includes two tape feed systems—a low-speed feed system for the recording and playback modes and a high-speed feed system for the fast-forward and rewinding modes, so that number of revolutions of the reel motor 401 may be set for the highest efficiency.

In the state shown in FIG. 20B, the tires 422 and 423 of the brake levers 420 and 421 are in contact with the reel mount wheels 316 and 306 of their corresponding reel mount devices B and A, regulating the rotation of the reel mount devices B and A. In this state, when the slider 410 is further slidden in the direction of the arrow $a_2$ or $a_4$, the brake levers 420 and 421 are rocked in the directions of the arrows $a_6$ and $a_5$, respectively, so that the rubber tires 422 and 423 are separated from the reel mount wheels 316 and 306 of their corresponding reel mount devices B and A. Thus, the additional function of the slider 410 as a control member for the main brakes obviates the necessity of an exclusive-use control member for the main brakes.

The locating member is not limited to the slide system, and may be of a rotation or rocking type, for example. What is essential here is that rotation or rocking of the locating member can make the position of the rotating shaft of one of the two rotating bodies, i.e., the idle wheel gear 427 and the idle gear 435, fixed, and the rotating shaft of the other movable.

In the arrangement of FIG. 1, the slider 410 is operated by the detecting arm 78 and the cam arm 180.

Namely, when the loading disc 11 is set in the loading start position, as shown in FIG. 21A, the cam arm 180 is in the rotation angle position 180A, and the slider 410 is regulated in position by the cam arm 180, with one end thereof abutting against the free end of the cam arm 180. In this case, the posts 407 and 435 engage the slits 415 and 416, respectively, to prevent the idle slide holder 403 and the idle holder 430 from rocking. The brake levers 420 and 421 are so located that the rubber tires 422 and 423 thereon are pressed against the reel mount wheels 316 and 306 of the reel mount devices B and A, respectively.

FIG. 21B shows a state in which the loading disc 11 is set in the loading end position. Also in this case, the cam arm 180 is in the rotation angle position 180A, and the slider 410 is set in the same position as in FIG. 21A by the cam arm 180.

Figure 21C:
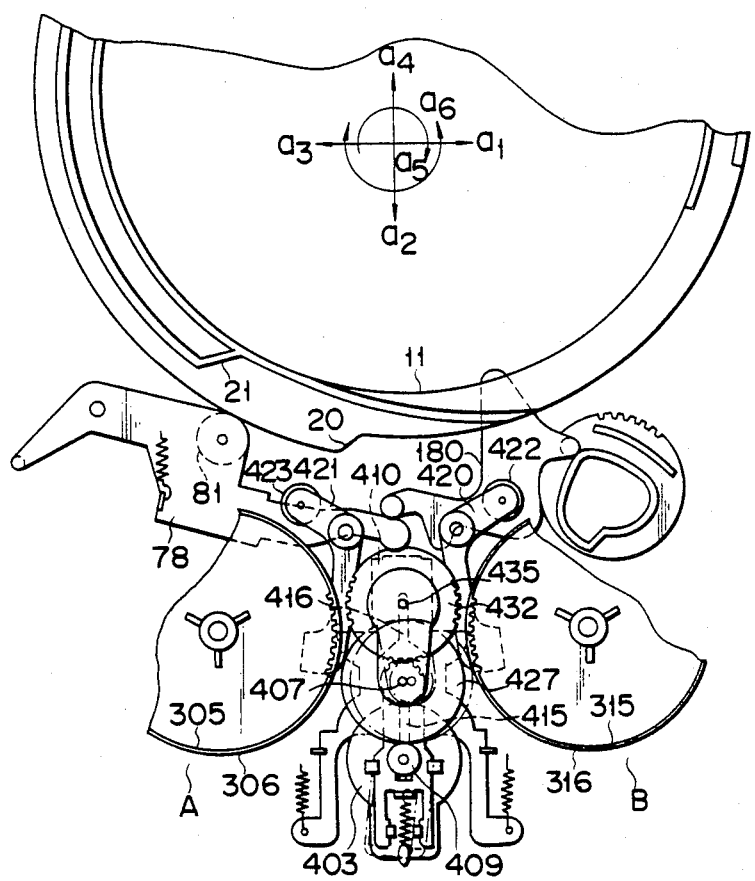

FIG. 21C shows a state in which the loading disc 11 is performing the loading or unloading operation. In this case, the roller clutch 81 is on the cam surface 20, and the detecting arm 78 is rocked in the direction of the arrow $a_5$, so that the slider 410 is slidden in the direction of the arrow $a_2$, pressed by one end of the arm 78. Accordingly, the post 407 slips out of the slit 415 to enter the opening 414, while the post 435 is located in the slit 416 as it is. Thus, the idle slide holder 403 is allowed to rock in the directions of the arrows $a_5$ and $a_6$ around the reel motor pulley 409. In loading, the reel mount devices A and B need not be driven, so that the reel motor 401 does not rotate, and the idle wheel gear 427 is located in the position represented by full line in FIG. 21C. In unloading, on the other hand, the take-up reel mount device B need be driven in the direction of the arrow $a_5$. Accordingly, the reel motor 401 is driven to rotate in the direction of the arrow $a_5$, and the idle wheel gear 427 is rotated in the direction of the arrow $a_6$ by the reel motor pulley 409. At the same time, the idle slide holder 403 is so rocked as to cause the idle wheel gear 427 to abut against the reel mount wheel 316 of the take-up reel mount device B, so that the reel mount wheel 316 is driven by the idle wheel gear 427 to rotate in the direction of the arrow $a_5$. In this way, the magnetic tape drawn out from the cassette is wound on the take-up reel.

Meanwhile, it is necessary that the main brakes for the reel mount devices A and B be entirely relaxed until immediately before the end of loading and then caused to act fully the moment the loading is completed. This is so because if the main brakes act before the loading is ended, the tape tension will be increased possibly to damage the magnetic tape. If it takes any time for the main brakes to act fully after the end of the loading, on the other hand, then the tape will be slackened.

Therefore, in the VTR of FIG. 1 in which the main brakes for the reel mount devices A and B are controlled by using the cam surface 20, it is necessary to set the position of the end portion of the cam surface 21 in the direction of the arrow $a_5$ so that the roller clutch 81 may be disengaged from the cam surface 21 in the loading end position. In this case, moreover, the main brakes are allowed fully to act just after the end of the loading, so that the end portion of the cam surface 20 in the direction of the arrow $a_5$ need be a steep slope.

Figure 22A:
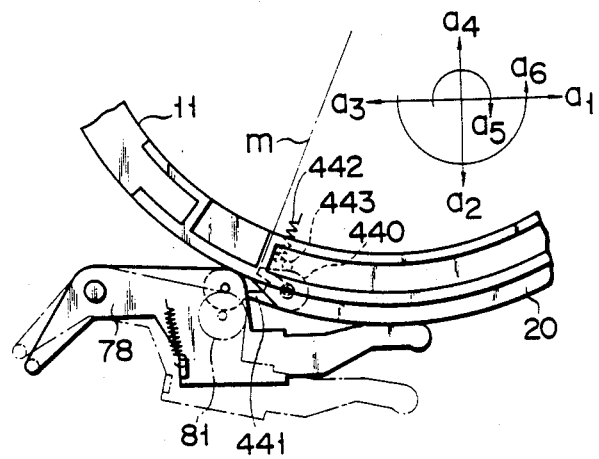
FIGS. 22A and 22B are plan views showing different operating states of the loading disc and the detecting arm.
Figure 22B:
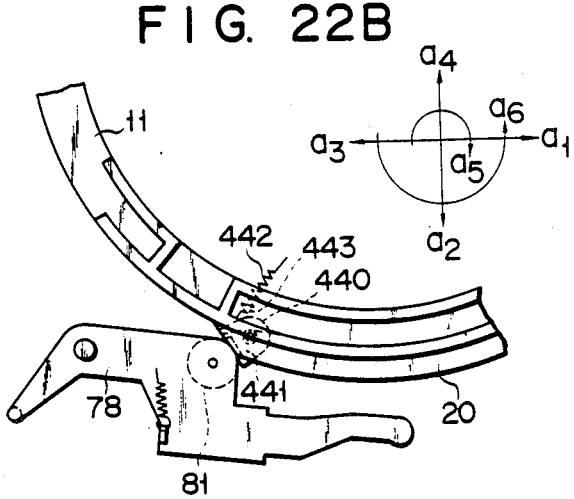

However, if the aforesaid end portion of the cam surface 20 is made steep, the load on the loading motor at the start of unloading will be increased. Therefore, the VTR of FIG. 1 is additionally provided with means to cope with this problem. Referring now to FIGS. 22A and 22B, such means will be described in detail. As shown in FIGS. 22A and 22B, the end portion of the cam surface 20 in the direction of the arrow $a_5$ is a slope gently declining in the direction of the arrow $a_5$. This end portion is fitted with a variable angle cam 440 rotatable in the direction of the arrows $a_5$ and $a_6$. A U-shaped portion 441 is formed at the free end portion of the variable angle cam 440.

FIG. 22A shows a state after the loading is ended. In this case, the variable angle cam 440 is rocked in the direction of the arrow $a_5$ and stopped in a position where a line m connecting two tip end portions of the cam 440 extends along the diameter of the loading disc 11. By locating the variable angle cam 440 in position, therefore, the detecting arm 78 may be rocked in the direction of the arrow $a_6$ the moment the loading is ended. Thus, the main brakes may act on the reel mount devices A and B the moment the loading is ended.

FIG. 22B shows a state at the start of unloading. In this case, the roller clutch 81 runs on to the cam surface 20 along the slope thereof, so that no substantial load is put on the loading motor at the start of the unloading. Since the variable angle cam 440 is pushed by the roller clutch 81 to rock in the direction of the arrow $a_6$, the roller clutch 81 can run on to the cam surface 20 without hindrance.

The variable angle cam 440 rocked in the direction of the arrow $a_6$ may be rocked in the direction of the arrow $a_5$ to establish the state of FIG. 22A for the loading operation by previously urging the cam 440 to rock in the direction of the arrow $a_5$ by means of a spring 442 or a torsion spring, for example. Instead of using such urging means, a reaction caused at the start of the rotation of the loading disc 11 in the direction of the arrow $a_6$ may be utilized for the rocking of the variable angle cam 440 in the direction of the arrow a₅. The variable angle cam 440 rocked in the direction of the arrow a₅ abuts against a stopper 443 and stops, and is located in the position shown in FIG. 22A.

The variable angle means is not limited to the aforementioned cam 440, and may be what is called up-and-down means using a leaf spring, for example.

Figure 23B:
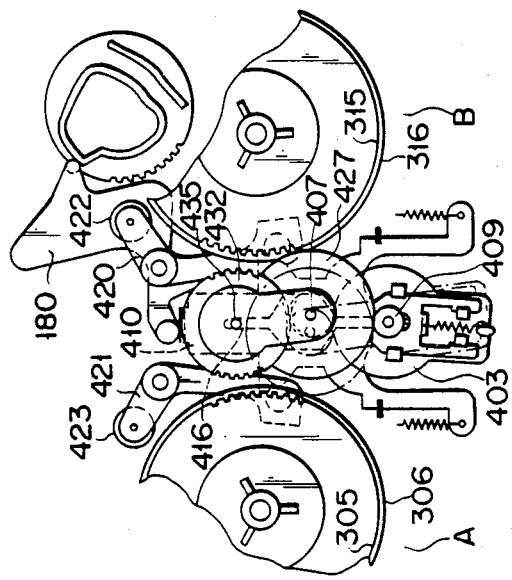
FIGS. 23A and 23B are plan views showing different operating states of the mode switching device and the reel mount driving device.
Figure 23A:
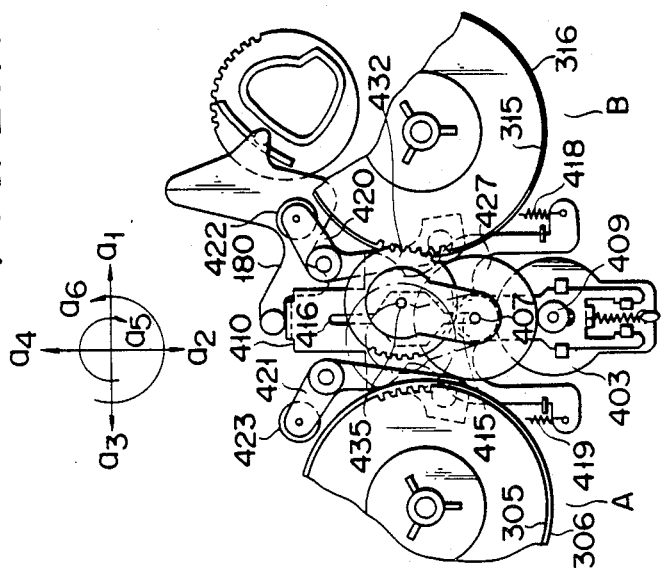

FIG. 23A shows a state for the recording or playback mode. In this case, the cam arm 180 is located in the rotation angle position 180C, so that the slider 410 is slidden in the direction of the arrow a₂ by the springs 419 and 418. At this time, the roller clutch 81 is disengaged from the cam surface 20, and hence the detecting arm 78 is located in a position where it is not in contact with the slider 410, as shown in FIG. 21B, constituting no hindrance to the slide of the slider 410 in the direction of the arrow a₄.

In this state, the post 435 is removed from the slit 416 and located in the opening 414, while the post 407 is located in the slit 415 as it is. Accordingly, only the idle holder 430 is allowed to rock in the directions of the arrows a₅ and a₆ around the post 407. Then, if the reel motor is rotated in the direction of the arrow a₆, the idle wheel gear 427 and the idle gear 432 are driven to rotate in the directions of the arrows a₅ and a₆, respectively. At the same time, the idle holder 430 is automatically rocked in the direction of the arrow a₅, and the take-up reel mount device B is driven by the idle gear 432 to rotate in the direction of the arrow a₅. Thus, the recording or playback operation is performed. This state also enables frame feed playback operation.

If the reel motor is rotated in the direction of the arrow a₅, on the other hand, the idle gear 432 is driven to rotate in the direction of the arrow a₅, and the idle holder 430 automatically rocks in the direction of the arrow a₆. As a result, the supply reel mount device A is driven to rotate in the direction of the arrow a₆, thereby establishing the reverse playback operation.

FIG. 23B shows a state for the rewinding mode. In this case, the cam arm 180 is located in the rotation angle position 180B, so that the slider 410 is slidden in the direction of the arrow a₂. Accordingly, the posts 407 and 435 are located in the opening 414 and the slit 416, respectively, so that only the idle slide holder 403 is allowed to rock in the directions of the arrows a₅ and a₆. In this case, if the reel motor is rotated in the direction of the arrow a₅, the idle wheel gear 427 is driven to rotate in the direction of the arrow a₆, and the idle slide holder 403 is rocked in the direction of the arrow a₅. Accordingly, the take-up reel mount device B is driven to rotate in the direction of the arrow a₅ for fast-forward operation. This state also enables fast playback operation.

If the reel motor is rotated in the direction of the arrow a₆, on the other hand, the supply reel mount device A is driven by the idle wheel gear 427 to rotate in the direction of the arrow a₆ for rewinding operation. This state also enables fast reverse playback operation.

The slider 410 and the cam arm 180 may be coupled by using, for example, a slot and a projection so that the slider 410 may be operated directly by the cam arm 180. By doing this, the slider 410 can be driven with a small operating force without using the springs 418 and 419 for urging the slider 410.

Generally, in the VTR, the magnetic tape is supplied from and wound on the take-up reel mount at loading and unloading, respectively, thereby preventing the shift of the tape position and hence the change of the counter indication. If the remaining tape length on the take-up reel is zero (virgin tape) at loading, however, the magnetic tape will have to be supplied from the supply reel mount. To attain this, an infinitesimal load is previously put on the supply reel mount by means of a soft brake lever and a soft brake spring so that the magnetic tape may be supplied from the supply reel mount against the infinitesimal load thereon only when the remaining tape length on the take-up reel mount is reduced to zero.

The load torque given by the soft brake lever and the soft brake spring is minimized, since if it is too large, the magnetic tape may be damaged by guide poles or cylinder lead. Namely, the load torque is just large enough to allow the take-up reel mount to rotate preferentially at loading.

On the other hand, there may be provided a system in which the magnetic tape is supplied from and wound on the supply reel mount. In this case, however, the magnetic tape may interfere with the guide poles and cylinder lead possibly to be damaged thereby. Besides, if the magnetic tape sticks to the reel mount, it cannot be wound at unloading and may greatly be damaged. Accordingly, this system cannot enjoy general use.

In the former system, the magnetic tape supplied from the take-up reel mount is only wound around the guide poles and cylinder lead at normal loading, kept from being damaged. If the magnetic tape sticks, moreover, the take-up reel mount can wind it while tearing it off.

It is difficult, however, to set the load torque of the supply reel mount in compliance with the aforementioned requirements. If the winding torque of the take-up reel mount is too large at unloading, then the load torque of the supply reel mount will yield to the winding torque to allow the tape to be wound from the supply reel on to the take-up reel.

Further, the winding torque of the take-up reel mount at unloading must be set with allowance for secure tape winding, while it is necessary, for the aforesaid reason, to minimize the load torque on the supply reel mount. The allowable range of the winding torque of the take-up reel mount and the load torque of the supply reel mount to fulfill those two contradictory requirements in quite narrow, and the magnetic tape would inevitably be wound from the supply reel on to the take-up reel at unloading due to variations in working accuracy of components and other factors. Accordingly, the tape position, as well as the counter indication, may be changed with every switching between the loading and unloading modes, greatly deteriorating the commercial value of the VTR.

Alternatively, there is provided a VTR in which the supply reel mount is braked by means of a solenoid at unloading. The VTR of such arrangement, however, is subject to such drawbacks as increased manufacturing cost, heavy weight and high power consumption.

In consideration of these circumstances, the VTR shown in FIG. 1 is additionally provided with a low-cost brake gear capable of preventing shifting of the magnetic tape position attributed to the switching between the loading and unloading modes by locking the supply reel mount at unloading, taking advantage of the reversal of the rotating direction of the loading disc at the mode switching.

Figure 24:
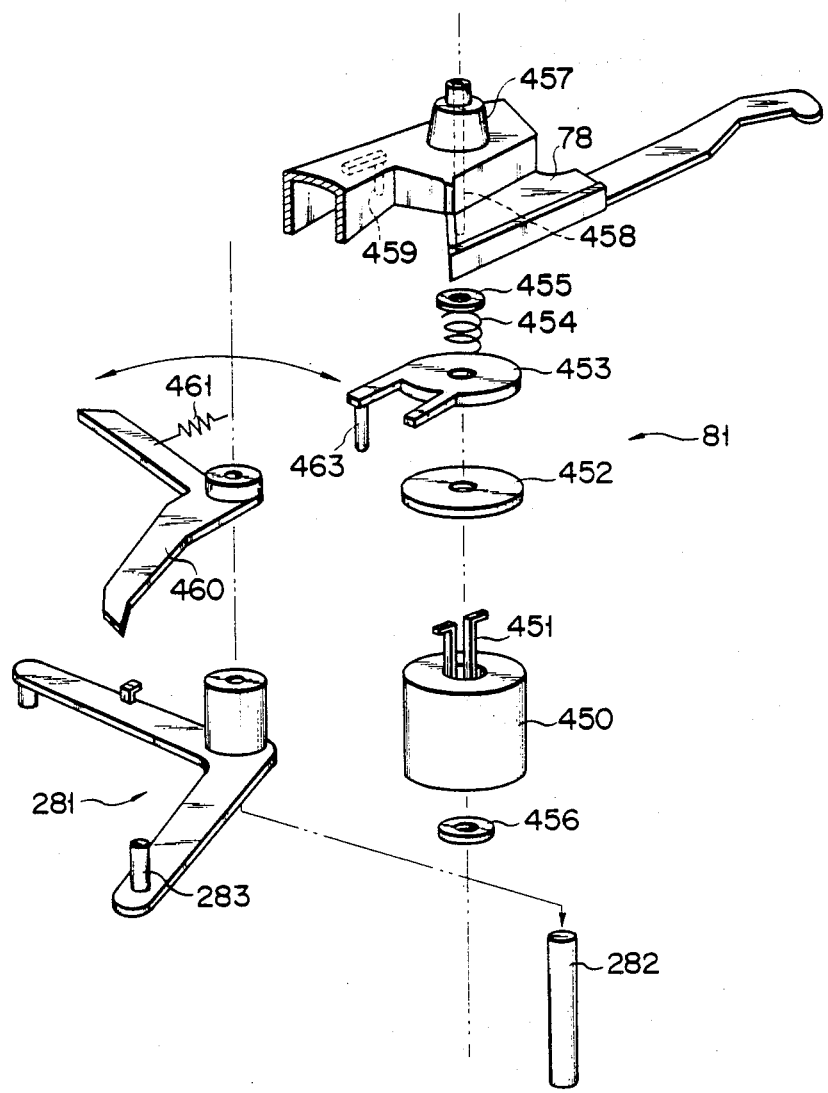
Figure 25A:
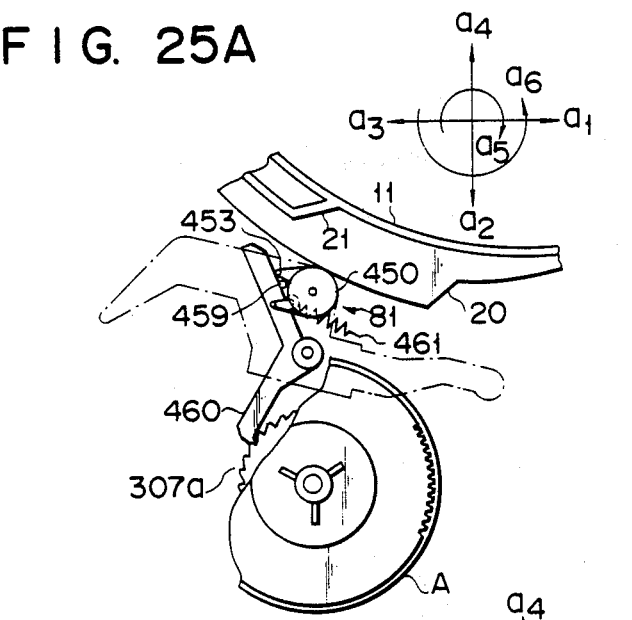
Figure 25B:
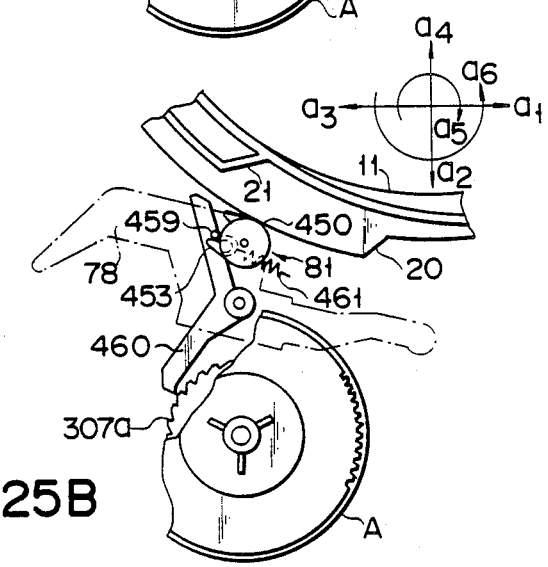

Referring now to FIGS. 24, 25A and 25B, the aforesaid brake gear will be described in detail.

FIG. 24 is a disassembled perspective view of the brake gear. The roller of the roller clutch 81 attached to the detecting arm 78, which is to be in contact with the loading disc 11, is formed of a molded main body and a rubber tire 450 attached to the outer periphery thereof, for example. A roller felt 452 is attached to the top end face of the rubber tire 450. The main body of the roller has two substantialy L-shaped shafts 451, and a clutch arm 453 is rockably mounted on the shafts 451 so as to be in contact with the top surface of the roller felt 452. The shafts 451 are fitted also with a compression spring 454 on the clutch arm 453. The roller, the clutch arm 453, and the compression spring 454 are joined together by means of washers 455 and 456 at both ends of the shafts 451 to form the roller clutch 81. The roller clutch 81 is disposed so as to be rotatable around a shaft 458 attached to a clutch housing portion 457 of the detecting arm 78, and so that the compression spring 454 may be encased in the housing portion 457. In this case, the rocking range of the clutch arm 453 is restricted to a given angular range by a stopper 459 which, protruding downward from the under surface of the detecting arm 78 between two prongs of the clutch arm 453, abuts against those prongs. Further, an operating portion 463 for operating the eject brake lever 460 protrudes from one of the prongs of the clutch arm 453. The eject brake lever 460 is rockably mounted on the shaft 282 (FIG. 13) supporting the soft brake 281, and is normally urged to rock in the direction of the arrow $a_5$ by an eject brake spring 461.

In the aforementioned construction, when the loading disc 11 rocks in the direction of the arrow $a_5$ for unloading, as shown in FIG. 25A, the clutch arm 453 is rocked in the direction of the arrow $a_6$ by the clutch torque of the roller clutch 81. Then, the operating portion 463 of the clutch arm 453 pushes the eject brake lever 459 to rock the same in the direction of the arrow $a_6$. Accordingly, the free end portion of the eject brake lever 459 engages the pawl portion 307a formed on the supply reel mount device A to lock the supply reel mount 301. Thus, the supply reel mount 301 is restrained from rotating in the direction of the arrow $a_5$, so that the magnetic tape on the supply reel mount 301 will never be wound on the take-up reel mount.

On the other hand, when the loading disc 11 rocks in the direction of the arrow $a_6$ for loading, as shown in FIG. 25B, the clutch arm 453 is rocked in the direction of the arrow $a_5$ by the clutch torque of the roller clutch 81, so that the eject brake lever 459 is rocked in the direction of the arrow $a_5$ by the eject brake spring 461 and disengaged from the pawl portion 307a. Accordingly, the supply reel mount 301 is unlocked. Thus, even if the remaining tape length on the take-up reel mount is reduced to zero, the magnetic tape will be supplied from the supply reel mount 301 without a possibility of its being damaged.

The clutch torque of the roller clutch 81 is large enough to counter the tension of the eject brake spring 461.

According to this invention, as described above, the rotating direction of the loading disc 11 is detected by the roller clutch 81, and the supply reel mount 301 is unlocked and locked at loading and unloading, respectively. Accordingly, there is no fear of the magnetic tape being damaged at loading. At unloading, moreover, the magnetic tape will never be wound on the take-up reel mount even though the winding torque of the take-up reel mount is large. Thus, the position of the magnetic tape, as well as the counter indication, may be kept stable in spite of repeated loading and unloading.

Using no solenoid plunger, moreover, the VTR of this invention may enjoy reduced manufacturing cost, as well as light weight and low power consumption.

Further, the use of the rubber tire 450 on the roller increases the coefficient of friction between the roller and the loading disc 11. Accordingly, there is no such trouble that a slip is caused between the roller and the loading disc 11 to stop the rotation of the roller and hence to make impossible the detection of the rotating direction of the loading disc 11. In order to eliminate such trouble, the roller and the loading disc may be replaced with gears for gear drive.

In the roller clutch 81, the roller body with the rubber tire 450 thereon, the clutch arm 453, and the compression spring 454 are joined together by means of the washers 455 and 456 into one united body, which is rotatably mounted on the shaft 458. Accordingly, there will be no such trouble that a friction loss is caused between the compression spring 454 and the detecting arm 78, as well as between the spring 454 and the clutch arm 453, to increase the rotation load of the loading disc 11. The rotation load of the loading disc 11 need be minimized, since it acts as the load of the motor to drive the loading disc 11. If the rotation load of the loading disc 11 is large, it can be offset by only increasing the allowance for the driving torque of the motor. This will, however, lead to increased motor weight, higher power consumption, increased manufacturing cost, etc. Accordingly, as mentioned before, the roller clutch 81 of the integral structure is mounted on the shaft 458 to reduce the friction loss between the compression spring 454 and the arms 78 and 453, thereby reducing the rotation load of the loading disc 11. The rotation load of the loading disc 11 may further be reduced by coupling the clutch arm 453 and the compression spring 454 by means of a clutch felt to form a double-clutch structure.

The brake device thus described in detail is not limited to the above-mentioned construction. For example, the brake device may be so constructed that the locking of the supply reel mount 301 by the eject brake lever 460 may be removed by means of the clutch arm 453 at loading, and that the eject brake lever 460 is caused to lock the supply reel mount 301 by the eject brake spring 461 at unloading. Alternatively, the clutch arm 453 and the eject brake lever 460 may be coupled without using the eject brake spring.

As for the brake means, it is not limited to the combination of the eject brake lever 459 and the pawl portion 307a, and may be any conventional brake means, such as a slide brake.

What we claim is:

1. In a video tape recorder comprising a motor; a loading disc; a supply reel mount and a take-up reel mount; and a reel mount driving device to be selectively associated with the supply reel mount and the take-up reel mount to establish recording, playback, rewinding, fast-forward, and stop modes, the improvement which comprises:

mode switching means for selectively transmitting the rotary force of the motor to the loading disc and the reel mount driving device so that the loading disc is rotated when the rotary force is transmitted to the loading disc, and to set the reel mount driving device to a selected one of said modes when the rotary force is transmitted to the reel mount driving device, wherein said mode switching means includes:
(a) clutch means for selectively transmitting the rotary force of the motor to the loading disc and the reel mount driving device,
(b) a loading gear engaging the loading disc,
(c) a cam arm coupled with the reel mount driving device, and
(d) a mode cam means capable or rotation for moving the cam arm according to the rotation angle position of the mode to set the reel mount driving device to the selected mode by means of the cam arm, the loading gear and the mode cam means being connected with the motor by the clutch means, wherein said clutch means transfers the rotary force from said loading disc to said reel mount driving device in response to said clutch means sensing an increased load transmitted thereto by said loading disc, said increased load indicative that said loading disc has stopped rotating, whereby said clutch means causes said reel mount driving device to thereupon rotate so as to set said reel mount driving device at said selected mode by virtue of said transferred rotary force.

2. A video tape recorder according to claim 1, wherein said clutch mechanism includes a shaft to be normally rotated by the motor when the motor is driven, a sun gear coaxially fixed to one end of the shaft, a planet gear support device coaxially rotatably mounted on the shaft, at least one planet gear rotatably supported by the planet gear support device and in mesh with the sun gear, and an internal gear in mesh with the planet gear and rotatorily connected with the loading gear.

3. A video tape recorder according to claim 2, wherein said mode switching means includes a lock arm capable of checking the rotation of the planet gear support device in one direction, an arm control mechanism for controlling the action of the lock arm, and an operating portion formed on the loading disc to drive the arm control mechanism to release the planet gear support device from the rotation check by the lock arm when loading is ended.

4. A video tape recorder according to claim 3, wherein said arm control mechanism includes a lock release arm for keeping the rotation check by the lock arm, a first lock restoring arm connected directly with the lock arm, and a second lock restoring arm engaged directly with the operating portion to drive the lock arm through the first lock restoring arm.

5. A video tape recorder according to claim 3, wherein said mode switching means includes stop means capable of checking the rotation of the planet gear support device in the other direction at unloading.

6. A video tape recorder according to claim 5, wherein said stop means includes a projection formed on the peripheral surface of the planet gear support device, and a ratchet to engage the projection to allow and check the rotation of the planet gear support device in the one and the other directions, respectively.

7. A video tape recorder according to claim 1, wherein said mode cam incudes a guide section in the form of a loop projecting eccentrically to the axis of rotation of the mode cam, and having a stop command position, a fast-forward/rewinding command position, and recording/playback command position, and the mode of said cam arm is set by the command position of the guide section in accordance with the rotation angle position of the mode cam.

* * * * *